Oct. 13, 1936.  B. JORGENSEN  2,057,030
ASSEMBLING MACHINE
Filed May 15, 1935    10 Sheets-Sheet 3
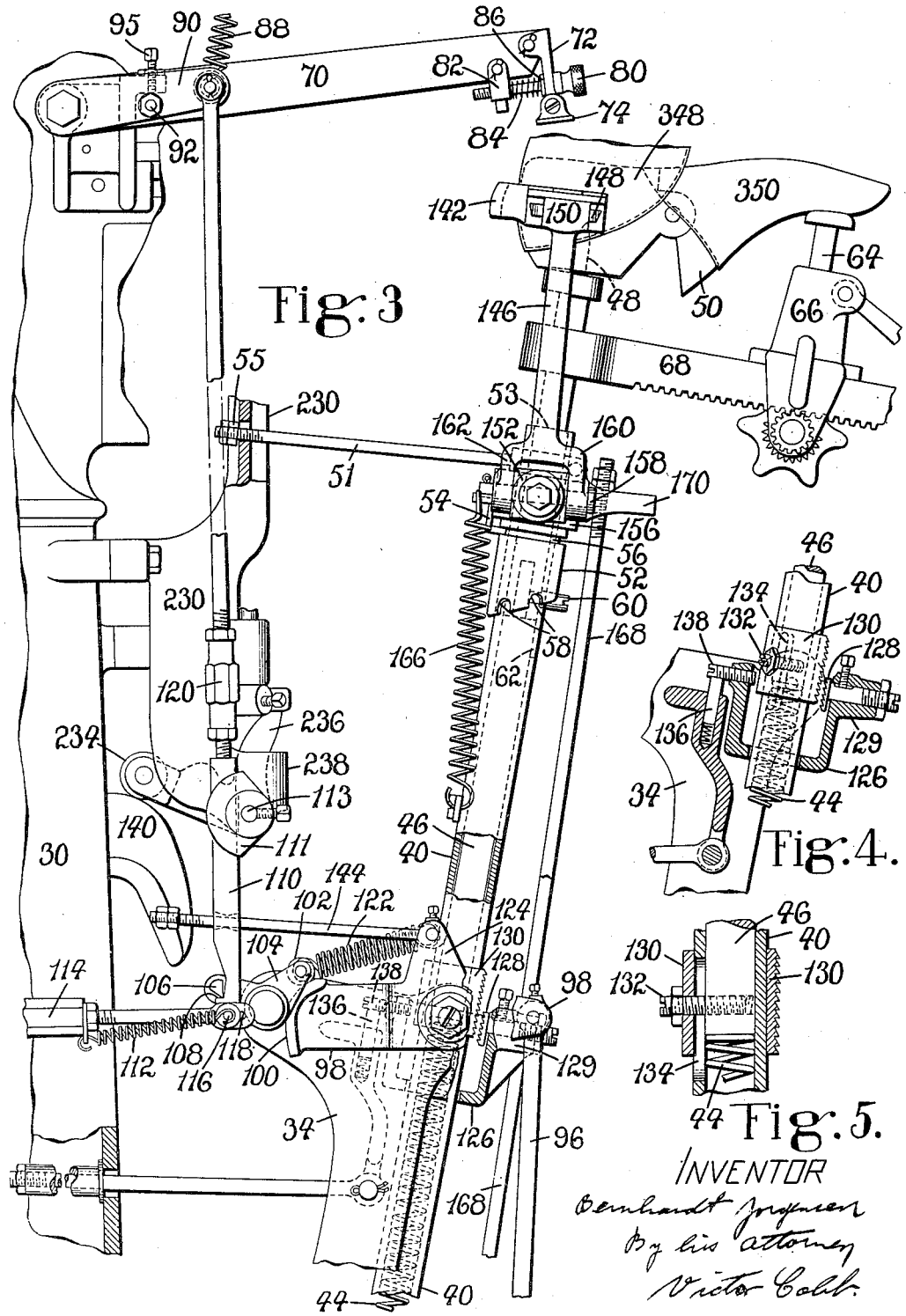

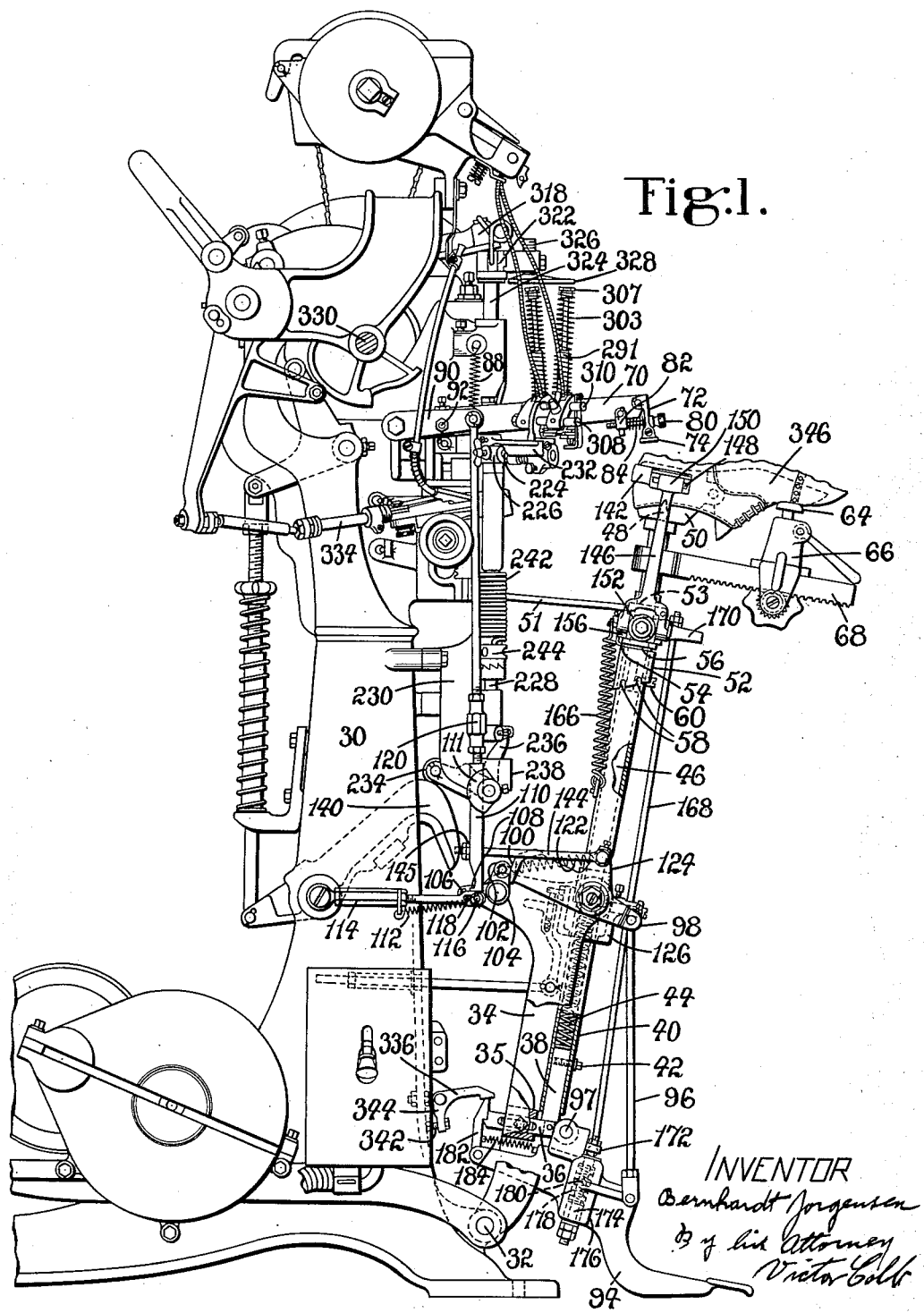

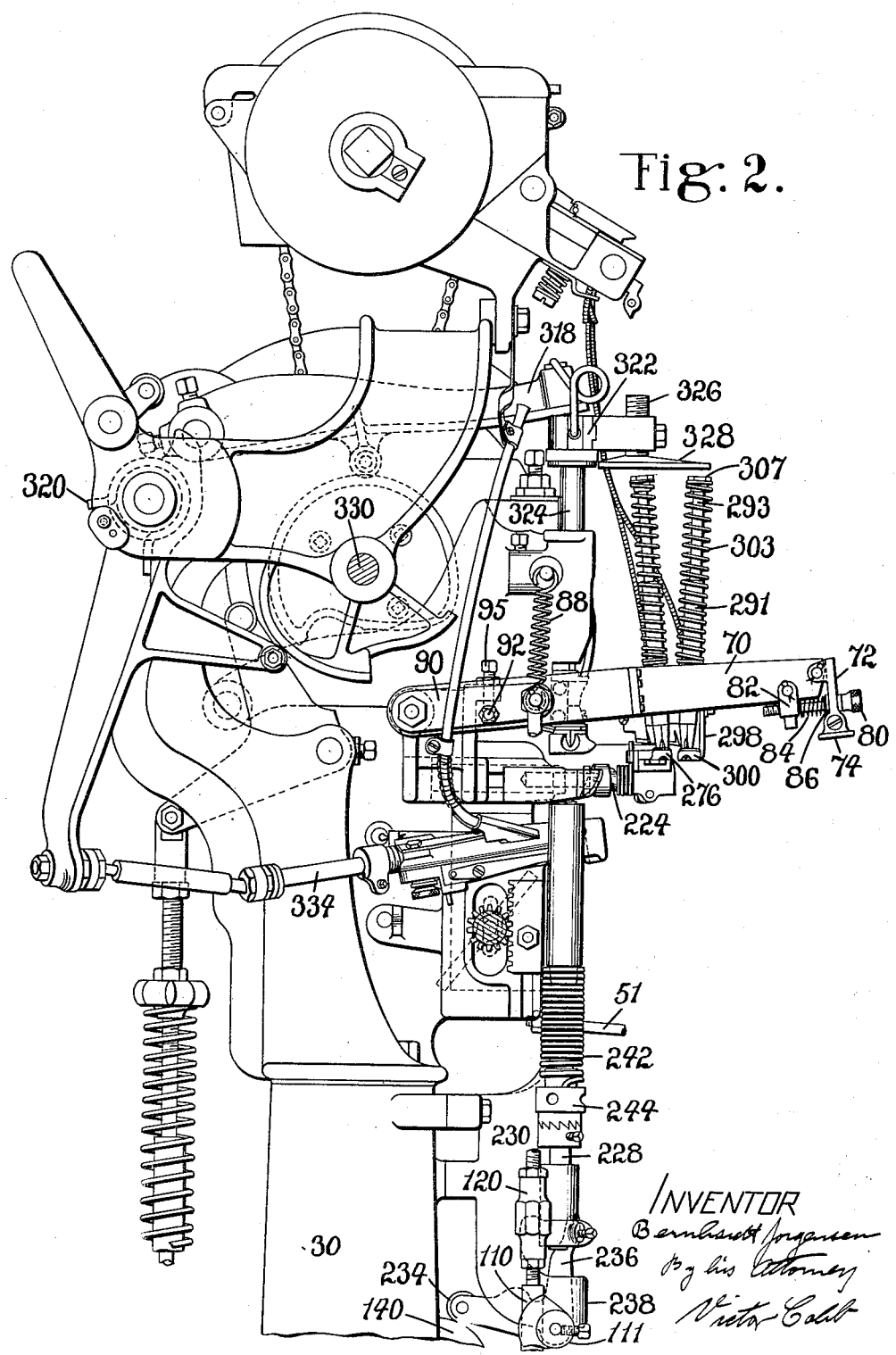

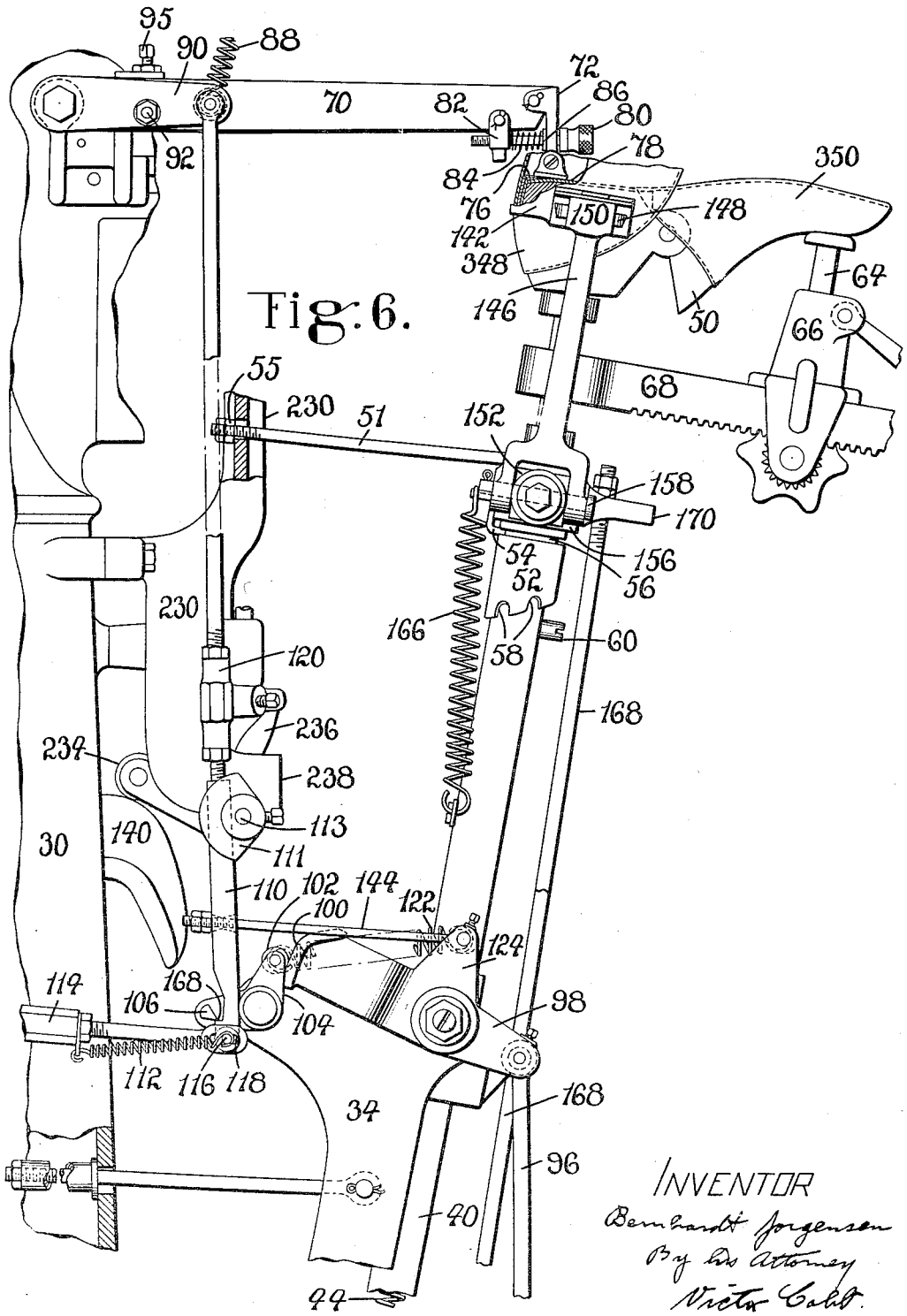

Oct. 13, 1936.  B. JORGENSEN  2,057,030
ASSEMBLING MACHINE
Filed May 15, 1935  10 Sheets-Sheet 5

INVENTOR
Bernhardt Jorgensen
By his attorney
Victor Colt

Oct. 13, 1936.  B. JORGENSEN  2,057,030
ASSEMBLING MACHINE
Filed May 15, 1935  10 Sheets-Sheet 6
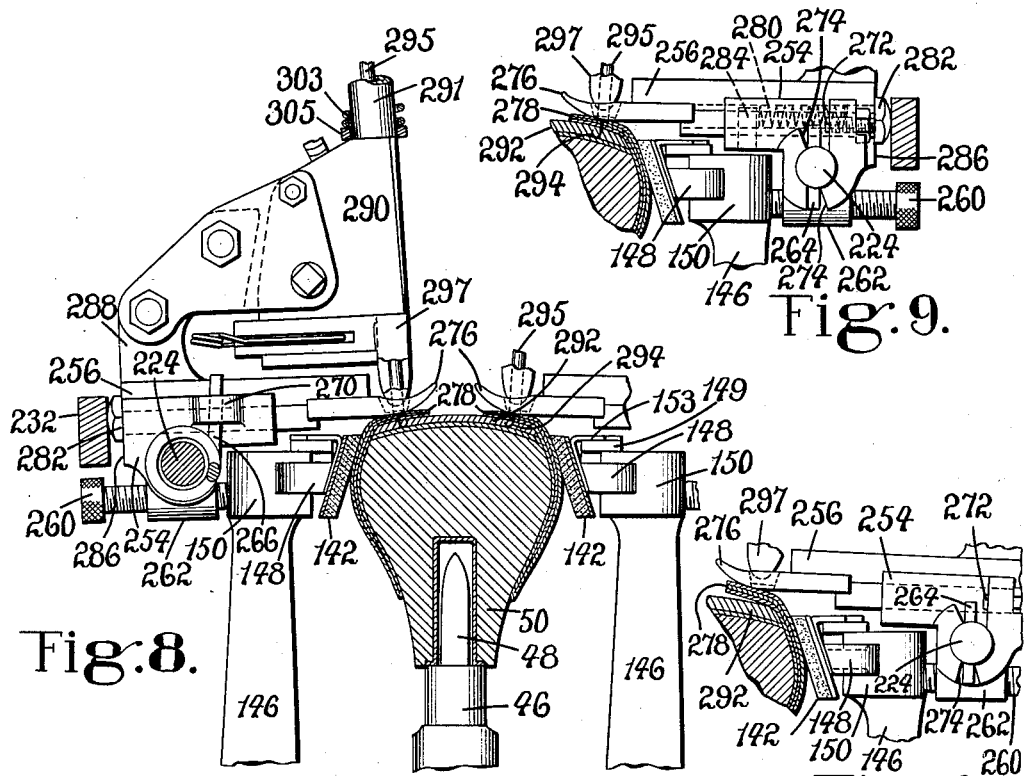
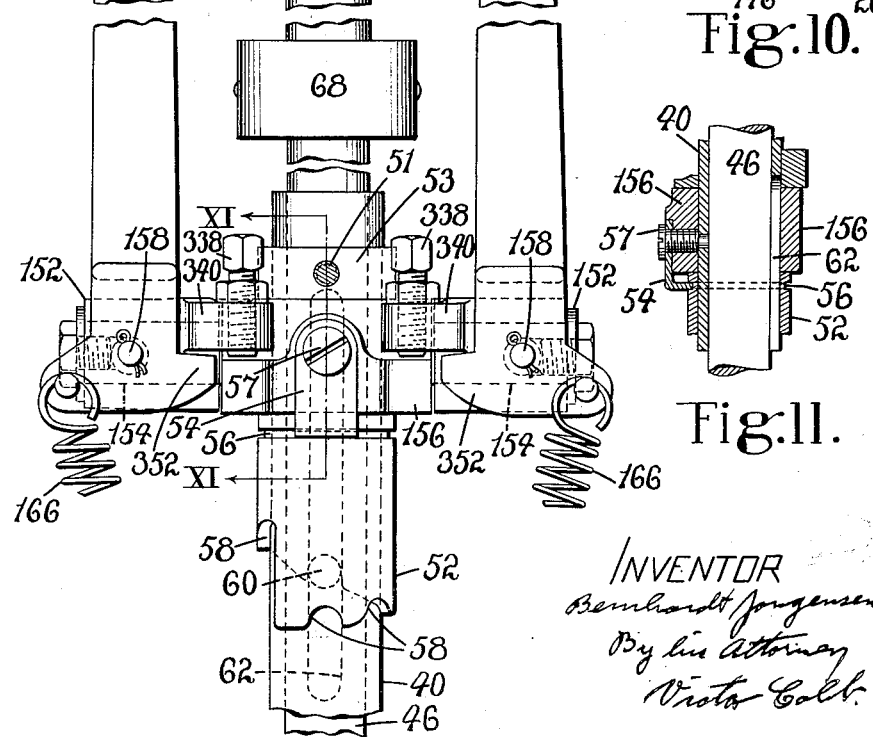

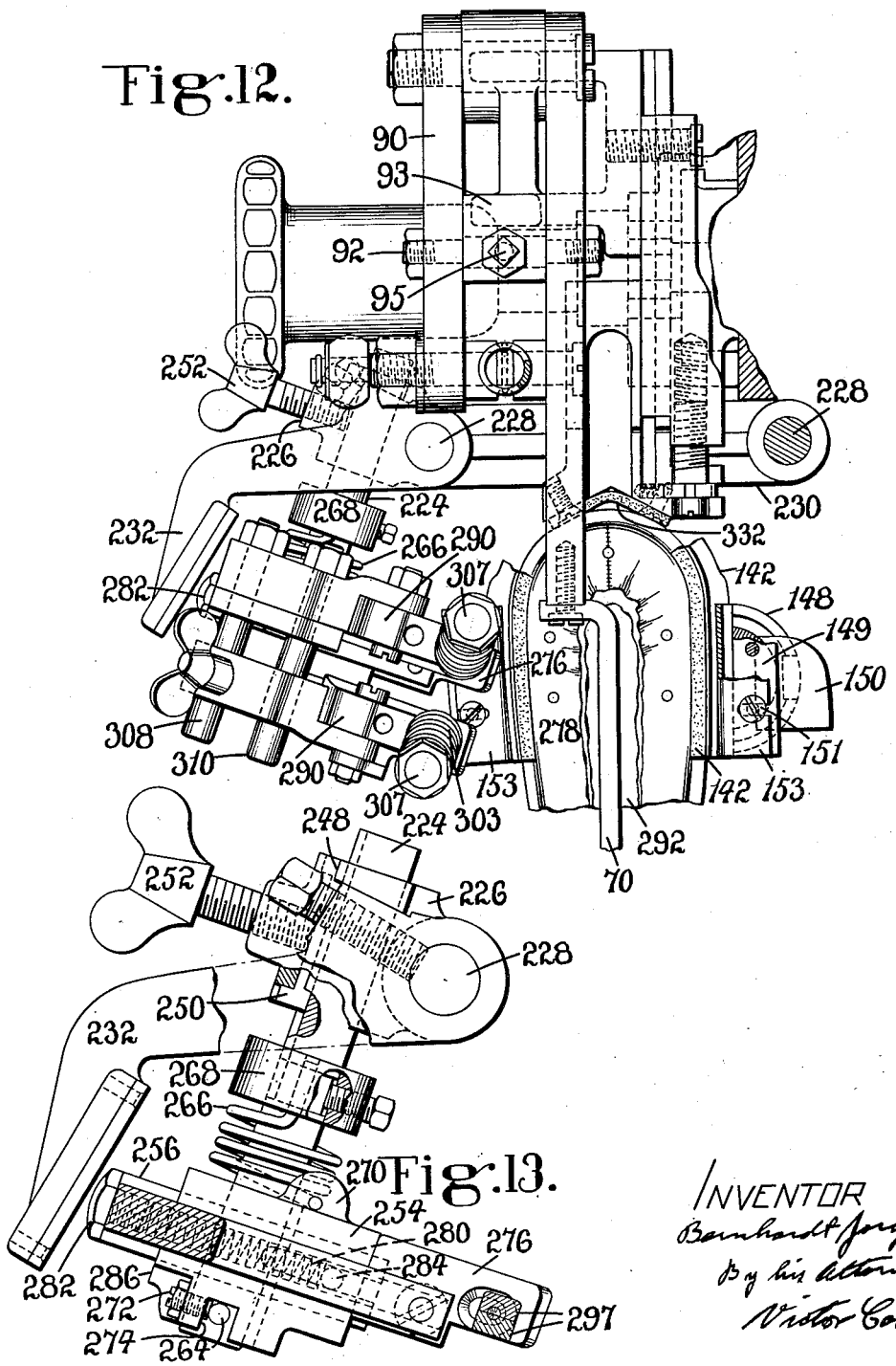

Oct. 13, 1936.  B. JORGENSEN  2,057,030
ASSEMBLING MACHINE
Filed May 15, 1935  10 Sheets-Sheet 8
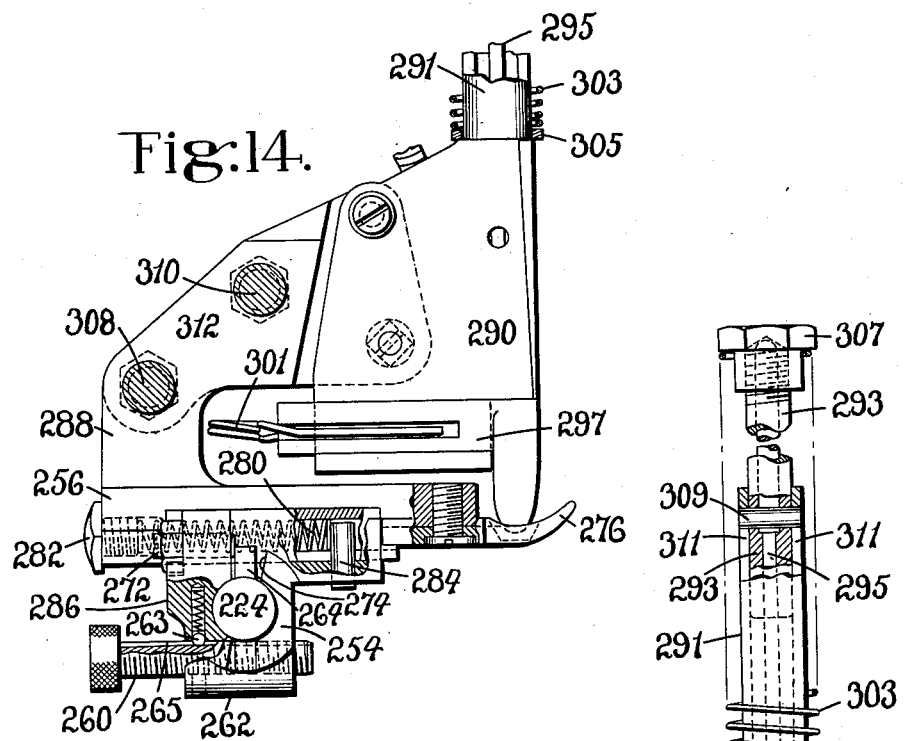
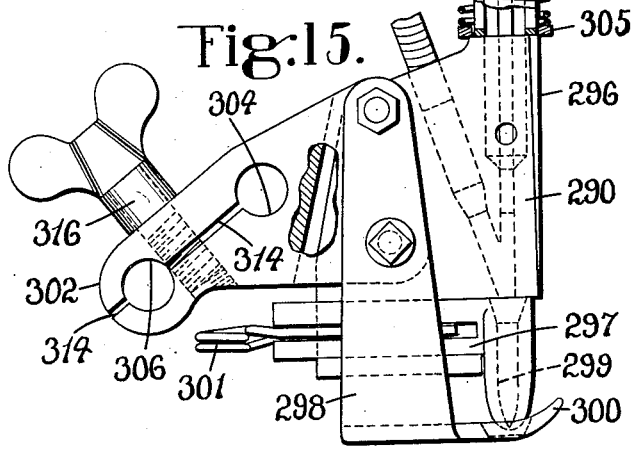
INVENTOR
Bernhardt Jorgensen
By his Attorney
Victor Coleb Oct. 13, 1936.  B. JORGENSEN  2,057,030
ASSEMBLING MACHINE
Filed May 15, 1935  10 Sheets-Sheet 9
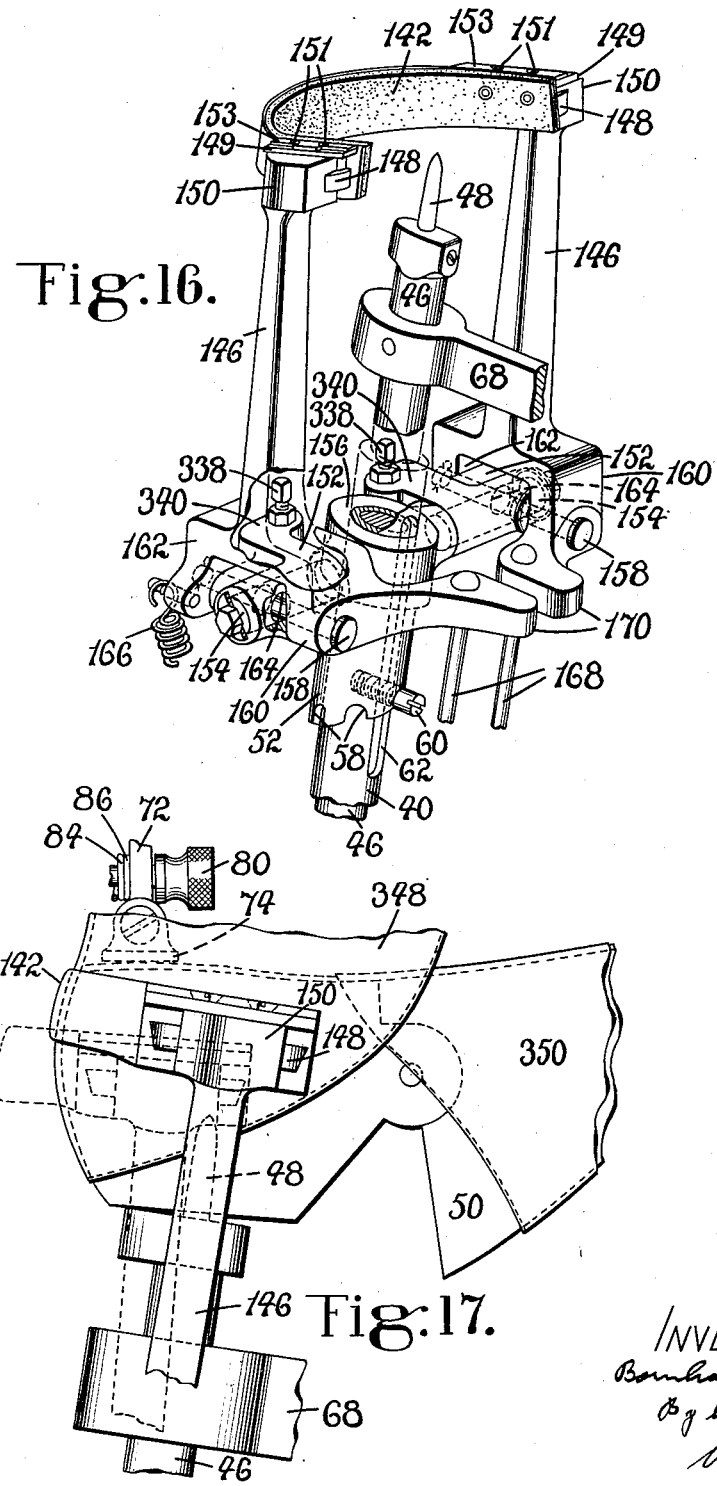

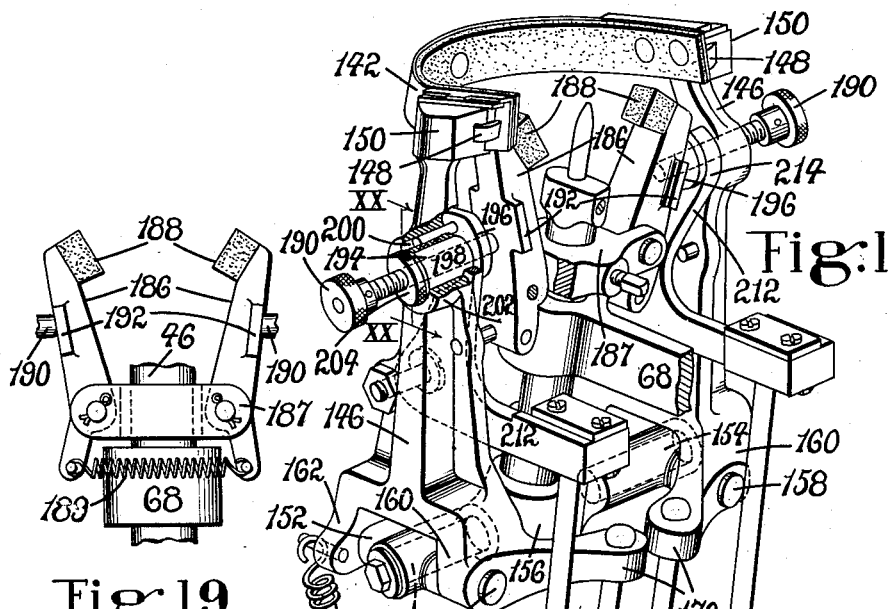
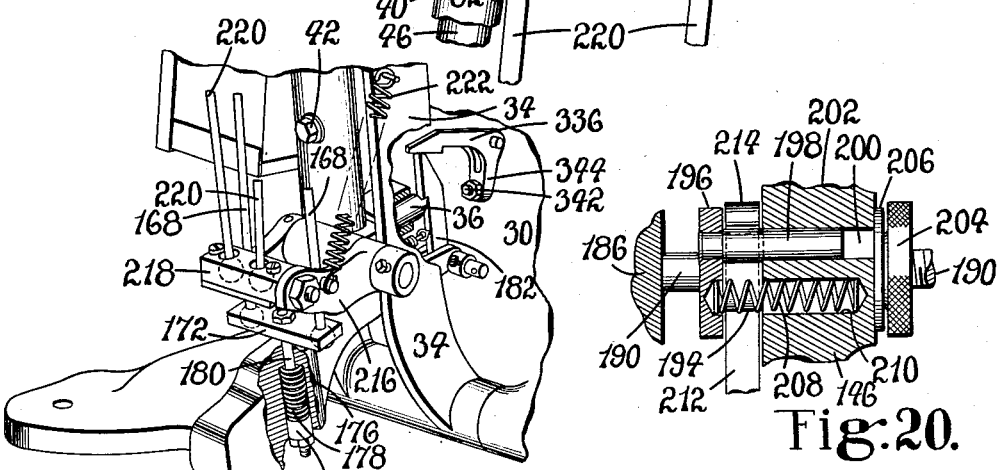
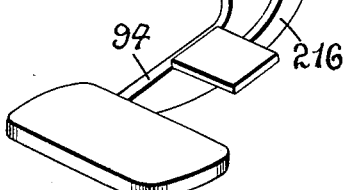

Patented Oct. 13, 1936

2,057,030

UNITED STATES PATENT OFFICE 2,057,030

ASSEMBLING MACHINE

Bernhardt Jorgensen, Marblehead, Mass., assignor to United Shoe Machinery Corporation, Paterson, N. J., a corporation of New Jersey Application May 15, 1935, Serial No. 21,596

82 Claims. (Cl. 12—4)

This invention relates to improvements in machines for use in the manufacture of shoes and is illustrated herein as embodied in an assembling machine of the type disclosed in United States Letters Patent No. 1,356,510, granted October 26, 1920, on an application of Hannah Ashton, executrix of the will of Orrell Ashton; in United States Letters Patent No. 1,443,288, granted January 23, 1923, on an application of William Stewart; and in United States Letters Patent No. 1,634,502, granted July 5, 1927, on my application.

It is to be understood, however, that the invention is not restricted to embodiment in a machine of this particular type, certain features of the invention being of more general application to machines for operating upon shoes. For convenience of description the term "shoe" is hereinafter employed to indicate shoe parts positioned on a last for the various shoemaking operations whereby such parts are shaped to the last, and said term is to be so construed when the context permits that construction.

In assembling shoe parts on lasts by means of assembling machines now in general use, the machine operator positions loosely on a suitable last an upper, which is usually provided with a counter to which adhesive has been applied, and positions the last with the shoe parts thereon on a work support which is initially disposed forwardly from its operative position for the convenience of the operator in positioning a last thereon. In order to position the shoe and its support in operative relation to the operating instrumentalities of the machine, the operator moves the shoe on its support from him until they are arrested by the engagement of the shoe with a gage or stop provided by the machine. In so moving the supported shoe, the shoe parts sometimes become disarranged upon the last by reason of the inability of the operator to hold them in position while moving the work and the work support away from him to position them for the assembling operation.

It is an object of the present invention to provide an assembling machine wherein shoe parts loosely positioned on a supported last may be engaged and held securely on the last before the operator swings the work support into operative position.

With the above object in view a feature of the invention comprises a work support movable to and from operative position in an assembling machine, a heel-embracing band movable with the work support as the latter moves to and from operative position, manually operated means herein illustrated as a treadle provided with connections for drawing the band about the heel portion of an upper on a last on the work support while the support is out of operative position, and means herein illustrated as lasting wipers for working the overlasting margin of an upper over an insole on the last bottom.

While the upper clamping means above referred to is illustrated in an assembling machine it may be constructed and arranged to engage either end of the shoe and it may be employed generally in machines for operating on end portions of shoes, particularly in machines for shaping end portions of shoes upon lasts. Accordingly, a further feature of the invention comprises an end-embracing band in a machine for operating on end portions of shoes and manually operated means for first moving the ends of a band widthwise of a shoe in the machine toward each other and for thereafter moving the band bodily lengthwise of the shoe.

The illustrated heel clamping means is also applicable generally to shoe machines provided with work supports, such as that herein illustrated, for the purpose of securing the shoe in predetermined position heightwise thereof and, accordingly, a still further feature of the invention comprises a work support in a machine for operating on shoes comprising a hollow shaft which is immovable endwise thereof, a spindle yieldingly supported therein, and means carried by the hollow shaft, for example the illustrated heel-embracing band, for engaging a shoe supported on the spindle and thereby holding the shoe and the spindle against upward movement.

Before the upper-clamping means is operated to clamp the upper against a supported last it is desirable that the shoe be located heightwise of the work support in position for the operations to be performed thereon. To this end the invention, in accordance with a further feature thereof, provides, in combination with a depressible work support, means, herein illustrated as a depressor, constructed and arranged to move the support with a shoe mounted thereon downwardly to a predetermined limit while the support remains at the limit of its movement from operative position, and means, such as a treadle, for actuating the depressor. The depressor is returned to its inoperative position while the shoe support remains at the limit of its movement from its operative position, such return movement being effected automatically in the illustrated machine after the connections between the depressor and its treadle have been broken. In accordance with another feature of the invention, the connections from the treadle to the depressor are broken by a further actuation of the treadle after the depressor has reached the limit of its downward movement. Before the depressor is permitted to return to its inoperative position it is desirable that the heel-clamping means engage the heel portion of the shoe in order to hold the shoe and its support from upward movement and, accordingly, another feature of the invention comprises manually actuated means for first actuating the depressor, then actuating said heel-clamping means, and finally releasing the depressor.

In accordance with a further feature of the invention, the illustrated machine is provided with manually operated means for first moving the ends of the shoe-embracing band widthwise of a shoe in the machine toward each other and for thereafter moving the band lengthwise of the shoe thereby to shape the shoe upon its last. In accordance with another feature of the invention, the illustrated machine is provided with means operable while the shoe support is out of its operative position for effecting relative movement of the shoe and the band thereby to wipe the band lengthwise of the shoe and heightwise thereof toward the shoe bottom. In the illustrated machine the heightwise wiping is effected by the actuation of the depressor.

Assembling machines now in general use do not shape the heel portions of uppers to their lasts but merely operate to fasten uppers to their lasts. It is an object of the present invention to provide a machine which will not only fasten the heel portions of shoe parts to their lasts but will also shape the shoe parts to their lasts and lay the overlasting margin at opposite sides of the heel portion of a supported shoe over an insole on the last bottom. It is to be understood, however, that the features of the invention relating to the shaping of uppers upon their lasts are not limited in their application to machines which also assemble such uppers on their lasts or to machines which operate on the heel portions of shoes.

For laying the overlasting margin of an upper over an insole on the last bottom the illustrated machine, in accordance with a feature of the invention, is provided with a lasting wiper, a carrier therefor constructed and arranged for limited movement in an arcuate path about an axis extending heightwise of the shoe, and means, for example a power-energized spring, for first moving the carrier, together with the wiper, through its arcuate path and to the limit of its movement in said path and for thereafter moving the wiper in a straight line relatively to its carrier.

In shoes provided with molded counters difficulty is often encountered in seating the flange of the counter, particularly that portion of the flange in the region of the heel breast line, upon the margin of the insole. It is of the utmost importance that the flange of the counter be firmly seated against the insole before the heel is attached to the shoe bottom and when, as is often the case, the assembling operation and the subsequent side lasting operation fail to seat the counter flange against the insole, the heel-seat-lasting machine is required to bend the counter over the edge face of the insole and press its flange against the margin of the insole. It requires a heavy and powerful machine to perform this operation on the counter whereas a much lighter machine could be employed to lay the heel-seat portion of the upper over the shoe bottom and secure it thereto. The best time to seat the counter flange upon the margin of the insole is during the assembling operation before the adhesive on the counter has set and before the ends of the counter wings have been secured by the side laster. With this in view, it is an object of the present invention to position the counter accurately in the heel portion of the shoe and to seat the flange of the counter firmly against the margin of the insole. Accordingly, a feature of the invention contemplates the provision in a machine for assembling and shaping the heel parts of shoes upon lasts of means for pressing the lasting wiper above referred to downwardly against the margin of the shoe bottom after its carrier has first moved to the limit of its arcuate movement and the wiper has advanced over the heel-seat portion of the shoe bottom. In the illustrated machine downward pressure is imparted to the wiper by means which first moves the carrier through its arcuate path and then advances the wiper over and upon the heel-seat portion of the shoe bottom.

The lasting wipers above referred to have associated therewith fastening-inserting means, for example tack driving means, which are arranged to drive tacks through suitable openings in the wipers in order to secure the overlasted marginal materials to the insole while the wipers are in advanced position.

These and other features of the invention will now be described with reference to the accompanying drawings and will be pointed out in the appended claims.

Fig. 1 is a side elevation of a machine embodying the features of the present invention, the work support being in its inoperative position and having a shoe positioned and clamped thereon;

Fig. 2 is a side elevation of the head of the machine with the work support removed;

Fig. 3 is a side elevation of a portion of the work support and shoe positioning mechanism;

Fig. 4 is a detail view of a part of the work support illustrated in Fig. 3;

Fig. 5 is a longitudinal section of a portion of the work support, said section extending through the slot 134 in said support;

Fig. 6 is a side elevation similar to Fig. 3 illustrating the depressor in its operative position;

Fig. 8 is a view in elevation looking forwardly of a supported shoe at parts of the shoe supporting and clamping mechanism, one of the wiper and tacker units being illustrated at the limit of its advancing movement;

Fig. 9 is a fragmental view in front elevation illustrating a wiper unit and part of the shoe clamping mechanism in engagement with a fragment of a supported shoe;

Fig. 10 is a fragmental front elevation similar to Fig. 9 showing the position of the wiper before it has been pressed downwardly against the shoe bottom;

Fig. 11 is a sectional view taken substantially on the line XI—XI of Fig. 8;

Fig. 12 is a plan view showing the heel end of a shoe supported in operative position and one pair of wiper and tacker units in retracted position and illustrating also certain details of the construction of the work-depressing assembly;

Fig. 13 is a detail view of one of the wiper assemblies, together with the member which actuates the wiper;

Fig. 14 is a detail view of the wiper and tacker unit, a portion of which is illustrated in plan in Fig. 13, the top of the tacker being broken away;

Fig. 15 is a detail view similar to Fig. 14 illustrating a second wiper and tacker unit which is carried by the unit illustrated in Fig. 14;

Fig. 16 is a perspective view of the heel-embracing band illustrated in Fig. 1 and a portion of its supporting and actuating mechanism;

Fig. 17 is a detail view in side elevation showing a fragment of the work support having the rear portion of a last mounted thereon, the heel band of Fig. 16 being illustrated in clamping engagement with shoe parts on the last, the retracted position of said band and one of its supporting arms being illustrated in dotted lines;

Fig. 18 is a perspective view of an alternative upper clamping mechanism;

Fig. 19 is a detail view in elevation looking at the back of a pair of upper gripping arms illustrated in Fig. 18;

Fig. 20 is a sectional view taken substantially on the line XX—XX of Fig. 18; and Fig. 21 is a perspective view of an alternative treadle mechanism associated with the construction illustrated in Fig. 18.

Figure 7:
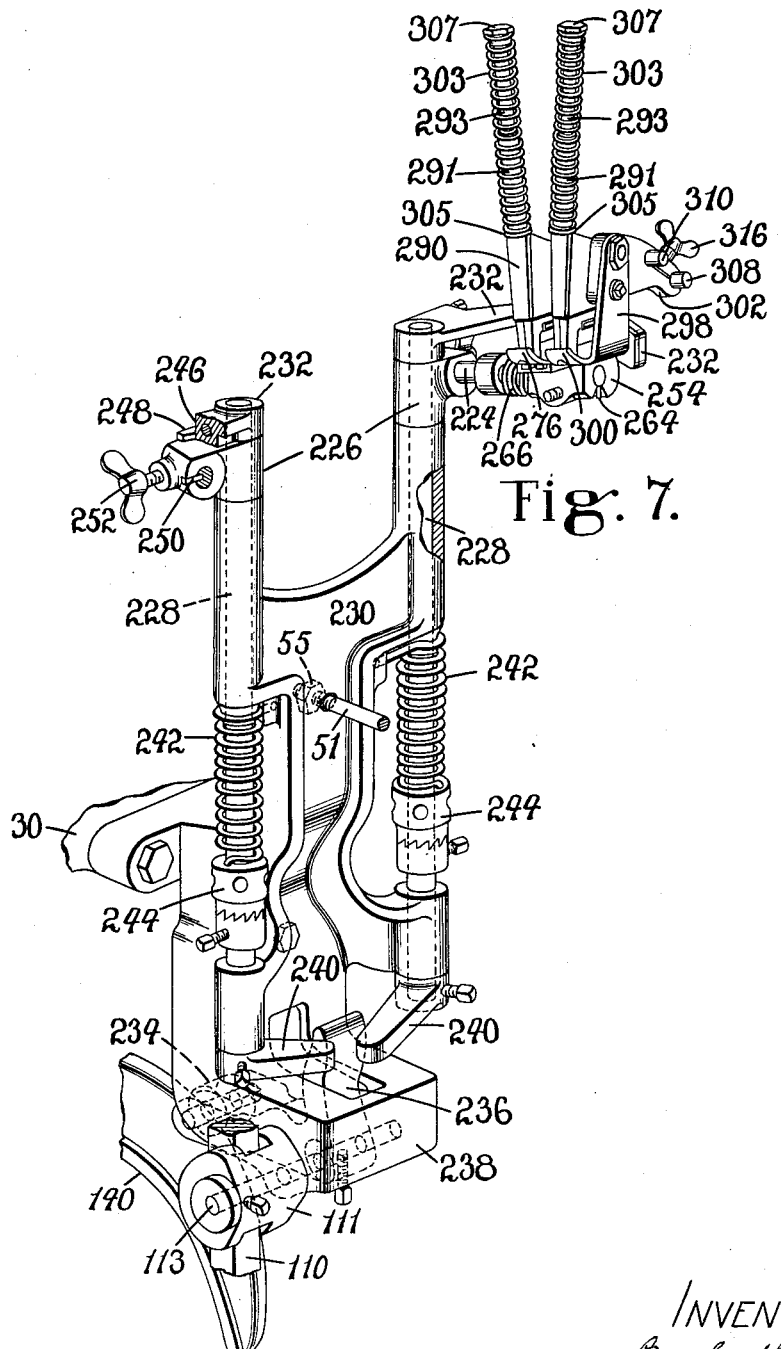
Fig. 7 is a perspective view of a pair of wiper and tacker units for operating on one side of a supported shoe, said units being illustrated in connection with their supporting and actuating mechanism.

In Fig. 1 of the drawings there is illustrated a machine having the general organization disclosed in the patents heretofore identified, to which reference may be had for a detailed description of parts which are not fully described herein.

The illustrated machine is provided with a base or column 30 to which is pivoted at 32 an upstanding carrier member 34 comprising a pair of parallel arms connected by a cross-bar 35 which carries a cross-pin 36 to one end of which there is pivoted the lower end of a rod 38 extending downwardly from a hollow shaft 40 of the work-supporting assembly. The rod 38 is secured in the shaft by a screw 42 and supports at its upper end a spring 44 extending upwardly through a part of the hollow shaft. Said spring, in turn, supports at its upper end a shaft or spindle 46 the upper end of which is provided with a last pin 48 for supporting a last 50 in inverted position. In order to limit movement of the work supporting assembly away from the machine column 30 and also to determine accurately the initial position of the supported last 50 lengthwise thereof relatively to a last-depressing member 70, a link 51 is provided between the upper end of the hollow shaft 40 and a bracket 230 secured to the machine column, one end of said link being secured to a collar 53 loosely mounted on the hollow shaft and supported upon the upper face of a fixture 156 secured to said shaft, the opposite end of said link extending freely through a hole in the bracket 230 (Fig. 3), movement of the link through said hole being limited by a nut 55 secured to the end portion of the link. The spindle 46 is initially positioned endwise of the shaft 40 by a collar 52 loosely mounted on the shaft near its upper end and supported by a finger 54 (Fig. 11) secured to the back of the fixture 156 on the hollow shaft by a screw 57 which also serves to secure the fixture to the shaft, the lower end of the finger 54 being bent inwardly toward the shaft for engagement within a peripheral groove 56 provided in the collar. The bottom edge of the collar 52 extends helically about the hollow shaft 40, and positioned at intervals around the bottom of the collar are notches 58 (Fig. 16) which receive alternatively a screw 60 extending radially from the spindle 46 through a slot 62 provided in the hollow shaft 40 and extending endwise thereof, said slot being long enough to permit adjustive movement of the spindle 46 within the shaft 40 within the range of adjustment afforded by the notches 58 in the collar 52 and also to permit movement of the spindle by the depressor arm 70 as hereinafter described. The toe end of the supported last and upper rest upon a toe support 64 mounted in a slide 66 and adjustable in said slide heightwise of the supported last, said slide, in turn, being adjustable lengthwise of the last on a supporting arm 68 which is secured to the spindle 46. The illustrated shoe support is substantially the same as the toe support illustrated in Patent No. 1,634,502, above referred to. It will be seen that the screw 60 which engages the notches in the collar 52 also holds the spindle from turning in the hollow shaft and holds the arm 68 in the plane of movement of the hollow shaft 40.

The collar 52 is adjusted in accordance with the average height of lasts of the class of shoes to be operated upon in order to position the heelseat portion of the last bottom slightly above its operative position heightwise of the work support thus to permit a slight depression of the supported last and the spindle 46 to locate the heel-seat portion of the last in proper position heightwise of the work support for engagement by the operating instrumentalities after the work support has been swung into its operative position. In the illustrated machine such depression of the last and its supporting spindle is effected, while the work support is at the limit of its movement from its operative position, by a manually-actuated depressor which, as herein illustrated, consists of a horizontally-disposed arm 70 (Fig. 3) pivoted to the machine frame and extending forwardly therefrom, said arm having pivoted to its free end a short arm 72 extending downwardly from the arm 70 and having a presser foot 74 pivoted to its lower end. The arm 70 positions the presser foot 74 above the heel-seat-portion of the supported last and substantially centrally of the last widthwise thereof. In operating upon uppers provided with molded counters it is desirable that the presser foot 74, during its downward movement, engage the flange of the counter, for example the flange 76 of a counter illustrated in Fig. 6, and press said flange downwardly against an insole 78 on the last bottom, thereby positioning the counter heightwise of the supported last. In order to adjust the presser foot lengthwise of the supported last for different sizes of lasts, thereby to insure the engagement of the presser foot 74 with the flange of the counter, an adjusting screw 80 is swiveled in the short arm 72 extending downwardly from the arm 70 and threaded in a tapped hole in a block 82 pivoted to the arm 70 and depending therefrom. A spring 84 positioned on the screw 80 between the block 82 and a washer 86 adjacent to the back of the short arm 72 yieldingly maintains the adjustment of the presser foot while permitting the arm 72 to swing slightly in a clockwise direction as seen in Fig. 6 during the downward movement of the arm 70 after the presser foot has come into engagement with the counter, thus obviating any movement of the presser foot lengthwise of the last after the presser foot has engaged the counter. The depressor assembly is normally held above the bottom of the supported shoe by a spring 88 (Fig. 2), the upper end of which is anchored to the machine frame and the lower end of which engages the forward end of an arm 90 pivoted to the machine frame coaxially with the depressor arm 70 and secured in a position of alinement with the arm 70 by a cross pin 92 (Fig. 12) the opposite ends of which have nuts threaded thereto while the enlarged central portion spaces the arms 70 and 90 from each other. The upward movement of the depressor assembly is limited by the engagement of the cross pin 92 with an abutment screw 95 in a bracket 93 on the machine frame. For manually operating the depressor arm 70 a treadle 94 (Fig. 1) is pivoted at 97 to the forward end of the cross-pin 36 and is connected by a link 96 to the forward end of a lever 98 which is pivoted to the outer surface of the upper end portion of one of the arms of the carrier member 34. The rear portion of the lever 98 has formed therein a flange 100 which provides a cam face which engages a cam follower or roll 102 pivoted to the end of the upwardly extending arm of a bell-crank lever 104 which, in turn, is pivoted to a rearward extension of that arm of the carrier 34 to which the lever 98 is pivoted. The roll 102 is held in engagement with the cam by a spring 122, one end of which engages the upwardly extending arm of the bell-crank lever and the other end of which engages an upward extension 124 of the lever 98. The horizontal arm of the bell-crank lever 104 is provided with a detent 106 constructed and arranged for engagement with a latch face 108 provided in a link 110 which is pivoted at its upper end to the forward end of the arm 90. The lower end of the link 110 is yieldingly urged rearwardly thereof to position it relatively to the detent 106 by a spring 112, the rearward end of which is anchored to an arm 114 pivoted to a cross-shaft journaled in the machine frame, the forward end of the spring engaging a cross-pin 116 in the lower end of the link. The movement of the lower end of the link 110 by the spring 112 is limited by the engagement of the cross-pin 116 at the rearward extremity of a slot 118 in the forward end of the arm 114. In order to maintain an accurate orientation of the lower end of the link 110 relatively to the detent 106, the link is provided at opposite sides thereof with flat faces which slide between flat surfaces of ears formed in a block 111 (Fig. 7) secured to a cross-pin 113 in a forward extension 238 of the bracket 230. The extent of downward movement of the depressor arm 70 may be adjusted by turning a turn-buckle 120 (Fig. 1) connecting the upper and lower portions of the link 110.

In order to hold the spindle 46 and the last and upper supported thereon from downward movement by the tack driving arm 318 which tacks the overlasting margin of the heel portions of the upper materials to the insole, means is provided for locking the spindle 46 against downward movement, the illustrated locking means comprising a ring 126 (Fig. 4) loosely encircling the hollow shaft 40 and pivotally mounted between the upper ends of the arms of the carrier member 34, said ring having a ratchet member 128 secured in a boss 129 extending forwardly therefrom, the upwardly extending teeth in said member being arranged for engagement with downwardly extending ratchet teeth formed in a collar 130 slidably mounted on the hollow shaft 40 and secured by a screw 132 (Fig. 5) to the lower end of the spindle 46. In order that the screw 132 shall not prevent the required relative movement of the hollow shaft 40 and the spindle 46, the hollow shaft is provided with a longitudinal slot 134 for the reception of the screw 132, said screw traveling lengthwise of the slot during such relative movement. The ratchet members are held disengaged from each other while the supported shoe is out of operative position by a spring-pressed pin 136 mounted in the carrier member 34 and arranged to engage a screw 138 extending rearwardly from the ring 126. When the supported shoe is in operative position the ratchet members are held in engagement with each other by a cam hook 140 common to machines of this type, said hook being power-operated to move the carrier member 34 toward the machine column after said member and the work support mounted thereon have been manually swung rearwardly toward the machine column.

In order to hold the supported last 50 against upward movement by the spring 44 in the hollow shaft 40 after the last-depressing mechanism has located the last in operative position heightwise of the work support, a heel-embracing band 142 (Fig. 1) is brought into engagement with the heel end of the upper on the last by mechanism actuated by the treadle 94. After the band 142 has engaged the upper, continued depression of the treadle 94 imparts forward movement to a link 144 the forward end of which is pivoted to the upward extension 124 of the lever 98 and the rear end of which is slidably mounted in an opening in the link 110 and has secured thereto a nut 145 which engages the rear face of the link. The forward movement of the link 144 disengages the link 110 from the detent 106, thereby permitting the depressor arm 70 to be raised by the spring 88, thus disengaging the presser foot 74 from the shoe bottom and permitting movement of the shoe supporting assembly to its operative position.

Referring now to the heel band 142 and its supporting and operating mechanism, said band, as illustrated in Fig. 16, is supported by its opposite ends on a pair of upstanding arms 146. Referring to Fig. 12, the heads 150 of the arms 146 are provided with arcuate T-ways within which are slidably mounted suitably constructed blocks 148, said blocks being provided with flanges 149 which overlie the heads 150 of the arms 146. Secured to said flanges by screws 151 are angle plates 153, the downwardly extending portions of which are riveted to the end portions of the heel band 142. Each of the blocks 142 swivels about an axis which intersects the upper-engaging surface of the band. The arms 146 are pivotally mounted on blocks 152 (Fig. 16) which, in turn, are journaled on trunnions 154 extending in opposite directions from the fixture 156 secured to the upper end of the hollow shaft 40. In order to permit a limited swinging movement of the blocks 152 on their trunnions, the pins 158 which pass through extensions 160 and 162 of the arms 146 and connect them to the trunnion blocks 152 extend through holes 164 provided in the trunnion blocks, which holes are of substantially larger diameter than said pins. The extensions 160 and 162 form yokes in the arms 146 which embrace the trunnion blocks and position the arms 146 thereon. The heel band 142 is yieldingly held in inoperative or retracted position by springs 166 connecting the downward extensions 162 of the arms 146 to the hollow shaft 40 (Fig. 1). Upon depressing the treadle 94 the arms 146 upon which the heel band is supported are swung toward each other simultaneously with the downward movement of the depressor arm 70, the movement of said arms being effected through links 168 the upper ends of which are mounted in arms 170 formed integrally with the downward extensions 160 of the arms 146 and arranged to extend toward each other. The lower ends of the links 168 have ball and socket connections with a cross-bar 172 (Fig. 21) secured to a plunger 174 slidably mounted in a cylindrical boss 176 in the treadle 94, a compression spring 178 being mounted on the shank 180 of the plunger 174, one end of said spring being seated against the head of the plunger and the other end of said spring being seated at the upper extremity of the bore in the boss 176 through which the head of the plunger slides. The spring 178 is compressed by the treadle 94 during the latter part of its downward movement, thereby pressing the heel band against the upper on the supported last. As seen in Fig. 16, the links 168 at their points of engagement with the arms 170 are farther from the center lines of the pins 158 than they are from the common center line of the trunnions 154, while the springs 166 which hold the heel band in retracted position are spaced at uniform distances from both center lines. Thus it will be seen that the force applied by the springs 166 to the arms 146 tending to swing said arms lengthwise of a supported shoe is equivalent to the force applied by said springs to said arms tending to swing said arms widthwise of a supported shoe, while, on the other hand, the force applied by the links 168 to the arms 146 tending to swing said arms widthwise of a supported shoe is substantially greater than the force applied by the links 168 to the arms 146 tending to swing said arms lengthwise of a supported shoe, the leverage exerted by the links 168 to swing the arms 146 widthwise of a supported shoe being preferably double the leverage exerted by the links 168 on said arms to swing the arms lengthwise of a supported shoe. Consequently, the depression of the treadle 94 operates first to move the arms 146 widthwise of a supported shoe and no movement of the arms lengthwise of a supported shoe takes place until after the arms have exerted a substantial pressure against the sides of the shoe. The swinging movement of the arms 146 about the trunnions 154 imparts to the heel band 142 a bodily movement, or a movement of translation, forwardly of the supported shoe. Since the last and the shoe parts thereon are being moved downwardly by the presser foot 14 during said bodily movement of the heel band, the band moves relatively to the upper on the last simultaneously forwardly of the last and toward the last bottom, the two extremities of said movement being indicated by the two positions of the heel band illustrated in Fig. 17. The band is held in heel-embracing position during the movement of the work support to operative position and during the operations on the shoe by a latch dog 182 (Fig. 1) pivoted to the rearward end of the treadle 94 and arranged to extend upwardly therefrom for engagement with a latch face formed in the rearward end of the cross-pin 36 in the carrier member 34, said latch dog being yieldingly held against the rear end of said cross-pin by a spring 184 connecting the latch dog to the central portion of the treadle.

In Figs. 18, 19 and 20 there is illustrated an alternative means for clamping the upper against the supported last comprising a pair of gripping arms or clamps 186 pivotally mounted between the arms of an H-shaped fixture or collar 187 secured to the spindle 46 between the arm 68 and the last pin 48 and disposed transversely of said arm 68. The gripping arms 186 are provided at their upper ends with pads 188 constructed and arranged to engage the top margin of an upper on a supported last and normally held out of upper-engaging position by a spring 189 (Fig. 19) connecting downward extensions of the arms 186. For operating the gripping arms 186 to bring the pads into engagement with the upper, the arms 146 which carry the heel band 142 also carry screws 190, the ends of which are arranged to abut the gripping arms 186, said arms being provided with extensions 192 to insure continued engagement of the screws 190 with the arms during the movement of the heel-band-supporting arms 146 forwardly of a supported shoe. Referring now to Fig. 20 illustrating one of the screws 190 and its supporting assembly, said screw is mounted in a collar 194 slidably mounted in a boss 202 in the arm 146, said collar being provided with a central hole threaded for part of its length for the reception of the screw 190. For securing the screw 190 relatively to the collar 194 the screw carries a lock nut 204 arranged for engagement with the outer extremity of the collar. In order to limit movement of the collar 194 in the direction of the arm 186 the lock nut 204 has formed therein a flange 206 arranged to engage the outer end face of the boss 202. The flange 206 is yieldingly held in engagement with the boss 202 by a spring 208, the major portion of which is arranged within a bore 210 extending outwardly of the heel-band-supporting arm 146 from its inner face. The inner end of the spring 208 is seated in a socket in a flange 196 on the collar 194, said socket being held in alinement with the bore 210 by a dowel pin 198 secured to the flange 196 and slidably mounted in a hole 200 in the boss 202. The spring 208 urges the flange 196 of the collar 194 away from the inner face of the heel-band-supporting arm 146 and maintains a determinate spaced relation between the opposite faces of the flange and the arm, which space is initially occupied by a spacer herein illustrated as a swinging L-shaped member 212 (Fig. 18) pivoted at the apex of the angle defined by its diverging arms to the inner surface of the heel-band-supporting arm 146 below the boss 202, the end of the upstanding arm of said L-shaped member being provided with a curved finger 214 constructed and arranged for engagement with the collar 194 adjacent to its flange 196. As illustrated in Fig. 20, the space maintained by the spring 208 between the flange 196 and the arm 146 is sufficient to permit the spacer arm 212 to move freely into said space. For disengaging the spacer arms from the collar 194 an auxiliary treadle 216 (Fig. 21) is pivoted to the cross-pin 36 coaxially with the treadle 94 and provided with a lug 218 in which sockets are provided for the ball ends of a pair of links 220 the upper ends of which have ball and socket connections with the ends of the horizontal arms of the spacer members 212. The spacer members are normally held in engagement with the collar 194 by a treadle spring 222 connecting the auxiliary treadle 216 to the arm 34. It will be seen that the screws 190 carried by the heel-band-supporting arms 146 not only serve to impart to the upper-gripping members 186 the inward motion imparted to the arms 146 by the treadle 94 but also serve to limit the movement of the heel band widthwise of a supported shoe. The screws 190 are preferably so adjusted that depression of the treadle 94 brings the upper-gripping members 186 firmly into engagement with the top margin of the upper and presses the ends of the heel band lightly against the opposite sides of the upper. It will be seen, however, that the engagement of the screws 190 with the arms 186 does not limit the bodily movement of the heel band forwardly of a supported last, the ends of said screws being free to slide widthwise of the arms 186 and their extensions 192 as the arms 146 swing forwardly of the supported shoe. Thus it will be seen that after the treadle 94 has been fully depressed and latched in depressed position the pads 188 are pressed firmly against the top margin of the upper while the curved portion of the heel band is pressed firmly against the back of the heel portion of the upper and the ends of the heel band are urged with a relatively light pressure against the opposite sides of the heel end of the upper. The light pressure of the ends of the heel band against the sides of the upper, if the screws 190 are properly adjusted, affords an opportunity for the operator to pull up the lining and the wings of the counter at opposite sides of the heel portion of the shoe and said band holds the counter and lining in the positions in which they are thus located. The auxiliary treadle 216 may then be depressed to disengage the spacer members 212 from the collar 194, thereby permitting further movement of the arms 146 toward each other by the compression spring 178 in the treadle 94, thus clamping the ends of the heel band firmly against the opposite sides of the heel end of the upper. When the auxiliary treadle is released the treadle spring 222 swings the spacer members 212 upwardly into engagement with the flanges 196 of the collar 194 and when the upper-gripping members are released, as hereinafter described, the compression springs 210 return the collars 194 to their initial positions, whereupon the spacer members 212 are returned by the treadle spring 222 to their initial positions, as illustrated in Figs. 18 and 20.

Referring now to the mechanism for working the overlasting margin of the heel portion of a supported upper over an insole on the bottom of a supported last (see Fig. 7), two pairs of wiper and tacker units are supported respectively upon two carriers or rods 224 which are positioned at opposite sides of the bracket 230 and clamped in predetermined position both rotatively thereof and endwise thereof in horizontal holes provided in swivel blocks 226 journaled on vertical shafts 228 mounted in suitable bearings in the bracket 230, said swivel blocks being supported at the upper extremities of said bracket. In the illustrated machine the construction of the pair of wiper and tacker units and the parts associated therewith operating on one side of the shoe is substantially the same as the construction of the corresponding pair of units and their operating parts for operating on the opposite side of the supported shoe. A description of one pair of units and the parts associated therewith will suffice for both assemblies and one assembly will now be described in detail. Secured to the upper end of the shaft 228 on which one of the swivel blocks 226 is mounted is an actuator arm 232 the forward end of which is positioned opposite the outer end of the rearward wiper and tacker unit. When the machine is at rest the actuator is held at the limit of its outward or retractive movement by the cam hook 140 which is then at the limit of its upward movement, as illustrated in Figs. 1 and 7, and is supporting on its upper surface a roll 234 pivoted to the end of the horizontal arm of a bell-crank lever 236 pivotally mounted in the forward extension 238 of the bracket 230, the end of the vertical arm of said lever engaging a pair of arms 240 secured to the shaft 228, respectively. Thus the cam hook 140 holds the actuator arm 232 in retracted position. Opposing said cam hook is a torsion spring 242 surrounding the shaft 228, one end of said spring being mounted in a collar 244 on said shaft and the other end of said spring being secured to the bracket 230. As the actuator arm 232 is retracted by the cam hook 140 its surface 246 engages a lug 248 extending upwardly from the swivel block 226, thereby swinging the wiper and tacker assembly out of shoe-engaging position. In the illustrated machine the rod 224 which carries the wiper and tacker assembly is clamped to the swivel block 226 by means of a U-shaped clamping member or key 250 which is positioned in a groove in the swivel block 226 extending lengthwise of the hole provided therein, the outturned end portions of said clamping key engaging opposite faces of the swivel block and preventing movement of the key lengthwise thereof relatively to said block. A groove is provided in the wiper-carrying rod 224 for the reception of said clamping key and a clamping screw 252 is threaded in a tapped hole in the swivel block 226 which is arranged to bring the end of said screw into engagement with the clamping key. The groove which is provided in the wiper-carrying rod 224 for the reception of the key 250 is of sufficient length to permit adjustive movement of the rod endwise thereof in the swivel block 226 in order to permit adjustment of the wiper and tacker units to adapt them to operate on shoes of all sizes. Referring now to Fig. 8, there is mounted on the rod 224 a swivel block 254 having a T-way in its upper portion extending transversely of the rod 224, within which T-way a slide 256 is mounted for limited movement toward and from the supported shoe. The movement of the swivel block 254, and the parts supported thereon, toward the supported shoe is limited by an abutment screw 260 having threaded engagement in a boss 262 extending downwardly from the swivel block 254, the end of said abutment screw being arranged to engage the head 150 of one of the heel-band-carrying arms 146. The abutment screw 260 is yieldingly held in adjusted position by a spring-pressed ball 263 (Fig. 14) positioned in a socket in the swivel block 254 for engagement in a longitudinal groove 265 in the screw. The swivel block 254 is freely mounted upon the rod 224 but is held against endwise movement thereon between a pin 264 (Fig. 13) extending diametrically through said rod and a torsion spring 266 surrounding said rod and having one of its ends secured by a collar 268 fastened to said rod while the other end of said spring is extended through an ear 270 on the swivel block 254. The torsion spring 266 also operates to urge the swivel block 254 and the parts mounted thereon in a clockwise direction, as seen in Fig. 8, such clockwise movement being limited by the engagement of a stop screw 272 (Fig. 13) mounted in the swivel block with the pin 264 in the rod 224, said swivel block being provided with notches 274 for the reception of said pin in order to permit said pin to be positioned in opposition to the stop screw 272. The adjustment of the stop screw 272 determines the initial position of the swivel block 254 and the parts thereon, thereby determining the initial elevation of a lasting wiper 276 secured to the under surface of the slide 256. Preferably the stop screw is so adjusted that the wiper 276 is initially located slightly below the level of the heel-seat portion of a supported shoe, thereby insuring a substantial pressure of the wiper against the overlasting margin 278 (Fig. 8) by the torsion spring 266 as the wiper moves inwardly over the shoe bottom. The slide 256 is yieldingly held at the limit of its movement away from the supported shoe by a compression spring 280 (Fig. 14) contained within a hole extending through the slide lengthwise thereof, one end of said spring abutting a headed screw 282 and the other end of said spring abutting a stud 284 extending upwardly from the base of the T-way in the swivel block 254, the slide 256 being slotted, as shown in Fig. 13, to permit movement thereof relatively to said stud. The head of the screw 282 is engaged by the actuator arm 232 as said arm advances to swing the wiper and tacker assembly toward the supported shoe, the spring 280 operating to maintain the slide 256 at the limit of its retractive movement until the abutment screw 260 has engaged the head 150 of the heel-band-carrying arm 146, the limit of the retractive movement of the slide being determined by the engagement of the rear end face of the wiper 276 with the adjacent face of the swivel block 254. Further advancement of the actuator arm 232 after the abutment screw 260 has engaged the arm 146 advances the slide 256 against the resistance of the spring 280 thereby moving the wiper 276 inwardly over the overlasting margin 278 of the supported shoe (Fig. 8) such advancing movement of the wiper being limited by the engagement of the head of the screw 282 with the face 286 of the swivel block 254, the head of said screw being made large enough to extend beyond the end face of the slide 256 for engagement with said face 286 of the swivel block. If the overlasting marginal materials 278 include the flange of a molded counter, said flange, in some cases, will tend to hold the margin of the upper together with the lasting wiper 276 slightly elevated, as illustrated in Fig. 10, as the wiper advances over the shoe bottom. In order to overcome this condition and to bring the overlasting marginal materials 278 firmly against the insole 292, as illustrated in Fig. 9, the force of the torsion spring 242 on the shaft 228 (Fig. 7) augments the force of the torsion spring 266 after the wiper has come to the limit of its movement over the shoe bottom, thereby insuring a sufficient downward pressure of the wiper 276 against the overlasting margin 278 to position the marginal materials firmly against the margin of the insole before the tack 294 is driven. Extending upwardly from the outer portion of the slide 256 is an arm 288 to which there is clamped a tacker unit comprising a plate 290, a portion of which extends upwardly in the form of a hollow shaft 291, said shaft having slidably mounted therein a rod 293 which carries a tack driving pin 295. Mounted in grooves in opposite sides of the bottom margin of the plate 290 are arms 297 which provide the opposite walls of a tack pocket 299 (Fig. 15), said arms being held in position by a spring 301. In order to hold the driving pin 295 in retracted position, as illustrated in Fig. 15, a spring 303 is coiled about the hollow shaft 291 between a washer 305 at the base of said shaft and a headed cap 307 secured to the upper end of the rod 293, upward movement of the tack driver being limited by the engagement of a cross-pin 309 in the rod 293 at the upper extremities of grooves 311 provided in the hollow shaft 291. Secured to the forward face of the tacker member 296 illustrated in Fig. 15 is an upstanding plate 298 the bottom margin of which is bent rearwardly into a horizontal position and extended to the right, as seen in Fig. 15, to form a lasting wiper 300. For lasting a portion of the overlasting margin 278 forwardly of that portion of said margin which is operated upon by the wiper 276 the wiper and tacker unit illustrated in Fig. 15 is mounted on studs 308 and 310 (Figs. 12 and 14) extending forwardly of the shoe from the arm 288 which extends upwardly from the slide 256, the tacker member 296 of Fig. 15 being provided with holes 304 and 306 which receive said studs. When the wiper and tacker unit of Fig. 15 is mounted on the studs 308 and 310 the lasting wiper 300 thereof is arranged substantially in alinement transversely thereof with the lasting wiper 276. It will be seen that the lasting wiper 300 and the tacker 296 associated therewith are adjustable lengthwise of the shoe within the limits prescribed by the length of the studs 308 and 310. The rear portions of the studs 308 and 310 extend through suitable holes in the arm 288 (Fig. 14) and through corresponding holes in an extension 312 of the tacker unit 290, the ends of said studs projecting from said extension 312 being threaded for the reception of clamping nuts which secure the tacker unit 290 to the arm 288 and secure the studs 308 and 310 in position for supporting the tacker member 296. In order to permit the tacker member 296 to be clamped in adjusted position endwise of the studs 308 and 310 the extension 302 is provided with slots 314. The split clamp thus provided is closed upon the studs 308 and 310 by a thumb screw 316. The wiper and tacker unit of Fig. 15 being held against movement relatively to the tacker unit 290 upon which it is supported, it will be seen that the actuator 232 imparts to the wiper 300 substantially the same movements widthwise and heightwise of the shoe which it imparts to the wiper 276.

Referring now to Fig. 2, the tack drivers which tack the overlasting margin of the heel portion of the upper to the insole are actuated by a tack-driving arm 318 which is operated by a torsion spring 320 in timed relation to the actuation of the wipers 276 and 300. The tack-driving arm 318 drives two tacks at each side of the shoe, said tacks being driven through suitable openings in the wipers, and it also drives a tack through the rear margin of the heel seat at the center of said margin widthwise of the shoe. For driving the side tacks the head 322 of the tack driver 324 which drives the central heel-seat tack is extended forwardly, as illustrated in Fig. 2, and has secured therein a threaded stud 326 extending upwardly from a horizontal plate 328 which is constructed and arranged to engage the heads of the four side tackers substantially simultaneously.

While the operation of various parts of the machine has been described heretofore, the following description of the operation of the machine may serve to promote a better understanding of the invention. Before operating on a given run of shoes the toe post 64 (Fig. 1) is adjusted in accordance with the contour of the bottoms of said shoes in order to cause the heel-seat portion of the bottom of a supported shoe to be so positioned that all of the five tacks to be driven into the heel-seat portion of the shoe bottom will be driven home and clenched. The operator then places on the work-supporting spindle 46 a last with an insole attached to its sole face, said last having arranged thereon an upper provided with a molded counter to which adhesive has been applied. After positioning the last and upper on the work support the operator depresses the treadle 94 while the work support remains in its forward or inoperative position, as seen in Fig. 1. The depression of the treadle turns the lever 98 in a clockwise direction from its position in Fig. 3 to its position in Fig. 1, thereby imparting downward movement to the depressor arm 70, bringing the presser foot 74 into engagement with the flange of the counter (Fig. 6), positioning the counter in proper relation to the heel portion of the last 50 heightwise thereof and, after seating the flange of the counter against the margin of the insole 78, imparting downward movement to the supported last and upper and the work-supporting spindle 46, thereby bringing the heel-seat portion of the last bottom into a position heightwise of the work support predetermined by the adjustment of the turn buckle 120 on the link 110. Simultaneously with the downward movement of the depressor arm the treadle 94 swings the heel-band-supporting arms 146 toward each other to bring the end portions of the heel band 142 into engagement with the opposite sides of the heel portion of the upper, said end portions of the band coming into engagement with the upper as the presser foot 74 comes into engagement with the flange of the counter. As the presser foot moves the last and upper downwardly as heretofore described the heel-band-supporting arms 146 swing forwardly of the supported last, wiping the band forwardly of the upper and bringing the curved portions of the band against the back of the heel portion of the upper, thereby drawing the upper materials firmly against the back of the last and working the sides of the heel portion of the upper materials forwardly of the last and also upwardly thereof by reason of the depression of the last during the forward movement of the arms 146 (Fig. 17). The combined forward and upward movement of the heel band 142 thus effected insures a firm engagement of the top margin of the upper at the back of the heel with the last and also insures positioning the margins of the counter wings well above the bottom of the insole in the most desirable position for its permanent attachment to the shoe by the subsequent operations of the machine. Continued depression of the treadle 94 after the heel band has come to the limit of its movement forwardly of the supported last compresses the spring 180 carried by the treadle, the pressure of said spring being delivered to the heel band in order to hold the band in clamping engagement with the upper during the subsequent operations of the machine. While the spring 178 is being compressed the presser foot 74 remains stationary since the cam roll 102 on the bell-crank lever 104 which operates the depressor arm 70 is riding on a dwell in the cam face 108 in said lever 98 during this portion of the depression of the treadle 94. As the treadle nears the limit of its depression it operates through the link 144 (Fig. 6) to disengage the link 110 from the detent 106, whereupon the depressor assembly is returned to its initial position. As the treadle comes to the limit of its depression the latch dog 182 carried thereby engages the cross-pin 36 and locks the treadle against upward movement. The operator then swings the work support rearwardly toward the machine column, thereby operating a one-revolution clutch to connect a cam shaft 330 to a continuously rotating pulley, thus starting the power cycle of the machine. At the beginning of the power cycle the cam hook 140 swings downwardly, engaging a roll carried by the rearward extension of the arm 34, thereby imparting further rearward movement to the work support and seating the heel end of the upper firmly against a heel stop 332 (Fig. 12). The downward movement of the cam hook 140 also serves to release the torsion springs 242 (Fig. 7), whereupon said springs move the actuator arms 232 toward each other. The movement of the actuator arms swings the carrier rods 224 and the parts mounted thereon toward each other until the movement of said carriers is arrested by the engagement of the stop screws 260 (Fig. 8) with the heads of the heel-band-carrying arms 146. Further movement of the actuator arms 232 toward each other by the force of springs 242 moves the wiper-carrying slides 256 relatively to the carriers 224 to advance the wipers in straight lines over the margin of the shoe bottom. Still further advancement of the actuator arms 232 after the wiper-carrying slides 256 have come to the limit of their movement relatively to the swivel blocks 254 swings the wiper and tacker assemblies about their carrier rods 224, thereby imparting to the wipers a downward movement to bring the overlasting margin 278 down firmly onto the insole 292 before the tacks are driven, and thereby insuring a proper positioning of the flange of the counter and the other overlasted upper materials upon the heel-seat portion of the insole. While the wipers remain in advanced position the tack-driving arm 318 operates to drive the five tacks illustrated in Fig. 12 through the overlasted marginal materials 278 and through the margin of the insole 292 against which the tacks are clenched by the heel plate on the last. If desired, the tack-driver 334 (Fig. 2) may be operated to drive a temporary tack through the back of the upper and into the end of the last in order to insure the retention of the line of the back seam during the subsequent operations on the shoe. During the remainder of the cycle of operations after the tacks have been driven the cam hook 140 is elevated, thereby swinging the bell-crank lever in a clockwise direction, as seen in Fig. 7, thus swinging the arms 240 on the vertical shafts 228 forwardly, such movement of the shafts 228 swinging the actuator arms 232 away from each other and bringing the surfaces 246 of said arms into engagement with the lugs 248 on the swivel blocks 226 and thereby returning the wiper and tacker units to their initial positions. The swinging of the arms 240 also energizes or winds up the springs 242 for the next operation of the machine. As the work support approaches the limit of its movement from operative position, the latch dog 182 which holds the treadle 94 at the limit of its depression is engaged by a hook 336 pivoted to the machine column 30 which hook engages and holds the upper extremity of the latch dog 182, causing the latch dog to swing about its pivotal connection with the rear end of the treadle 94 during continued movement of the work support from operative position and thereby disengaging the latch dog from the cross-pin 36 and permitting the return of the heel band 142 to its initial position by the springs 166. In order to permit the latch dog 182 to engage the under surface of the forward end of the hook 336 and to lift the hook slightly as the work support swings toward its operative position the elevation of the forward end of said hook is accurately determined by the engagement of a stop screw 342 in an arm 344 extending downwardly from said hook with the front of the machine column.

The initial position of the heel band lengthwise of the supported shoe is determined by the engagement of stop screws 338 (Fig. 8) mounted in arms 340 formed in the blocks 152 with suitable surfaces provided in the fixture 156 secured to the hollow shaft 40. The initial position of the heel-band-carrying arms 146 widthwise of the supported shoe is determined by the engagement of extensions 352 of the respective arms with the arms 340.

When the machine is provided with the upper-clamping mechanism illustrated in Fig. 18 the last-depressing arm 70 is so adjusted heightwise of the supported last that the downward movement of the last and its supporting spindle 46 is completed before the gripping arms 186 swing in against the top margin of the upper. Thus it will be seen that the forward and upward wiping action of the band 142 illustrated in Fig. 17 and heretofore described is not obtained when the alternative construction of Fig. 18 is employed. This construction is well adapted for use in operating on uppers of the conventional type such, for example, as the upper 346 illustrated in Fig. 1 since in this type of upper it is often desirable to operate on the heel portion of the lining with hand pincers in order to draw the lining into smooth condition upon the last and to eliminate any wrinkles that may have occurred when the counter was positioned in the heel end of the upper, and this operation may conveniently be performed while the pads 188 are clamped against the top margin of the upper and while the end portions of the heel band 142 are pressed lightly against the upper to hold the lining in the position in which it is located by the hand pincers.

The upper-clamping mechanism illustrated in Fig. 16 is well adapted to operate on shoes in which the lining at the heel portion of the shoe is stitched to the upper to form a counter pocket since such linings are accurately positioned relatively to the upper when the seam creating the counter pocket is formed and consequently no special attention thereto is required. The construction illustrated in Fig. 16 is particularly adapted to operate on the quarters of uppers such as that illustrated in Figs. 3, 6, and 17 in which the quarter 348 is not attached to the vamp 350 but is assembled on the last and shaped thereto after the vamp has been assembled and shaped to the forepart of the last. It is obvious that no tensioning of the quarter 348 lengthwise of the last is effected in the pulling-over operation as performed on such shoes since the quarter has not been assembled on the last when that operation takes place and consequently the tensioning of the quarter forwardly of the last which, in operating on shoes of the conventional type, is effected in the pulling-over operation must be effected in a subsequent operation in the manufacture of shoes provided with the type of upper illustrated in Fig. 17. The mechanism illustrated in Fig. 16 is well adapted to engage the quarter 348 and work it forwardly of the last 50 since the heel embracing band, as hereinbefore described, firmly engages the opposite sides of the heel portion of the upper before the arms 146 swing forwardly of the supported last to bring the heel band into the position illustrated by full lines in Fig. 17. During such forward movement of the arms 146 the heel band is therefore in frictional engagement with the upper and operates to work the upper forwardly of the last and simultaneously heightwise thereof toward the last bottom, thereby working the heel part of the upper forwardly of the last and shaping the heel part to the heel portion of the last. This operation of the heel band is particularly effective to shape the portion of the quarter 348 in the region of the back seam to the heightwise curvature of the heel end of the last.

While it is considered preferable to employ the alternative heel-engaging devices as above described, it is to be understood that neither the heel-embracing band of Fig. 16 nor the heel-engaging devices of Fig. 18 are limited to use in the manufacture of certain kinds of shoes, but, on the contrary, both constructions may be employed in the manufacture of any and all sorts of shoes in which the uppers are shaped upon lasts and their margins are lasted over insoles on the last bottom.

Having thus described my invention, what I claim as new and desire to secure by Letters Patent of the United States is:

1. In a machine for operating on shoes, a lasting wiper, a carrier therefor constructed and arranged for limited movement in an arcuate path about an axis extending heightwise of a shoe in the machine, and means for first moving the carrier together with the wiper through its arcuate path and to the limit of its movement in said path and for thereafter moving the wiper in a straight line relatively to its carrier.

2. In a machine for operating on shoes, a lasting wiper, a carrier therefor constructed and arranged for limited movement in an arcuate path about an axis extending heightwise of a shoe in the machine, means for first moving the carrier together with the wiper through its arcuate path and to the limit of its movement in the said path, then advancing the wiper directly over and upon the heel-seat portion of the shoe bottom, and thereafter pressing the wiper downwardly against the margin of the shoe bottom.

3. In a machine for operating on shoes, a lasting wiper, a carrier therefor constructed and arranged for limited movement in an arcuate path about an axis extending heightwise of a shoe in the machine, and a slide on which the wiper is mounted, said slide being supported on the carrier for movement in a straight line transversely of the shoe after the carrier has come to the limit of its movement through its arcuate path.

4. In a machine for operating on shoes, a lasting wiper, a carrier therefor adjustable lengthwise of a shoe in the machine and constructed and arranged for limited movement in an arcuate path about an axis extending heightwise of the shoe, and means for first moving the carrier, together with the wiper, through its arcuate path and to the limit of its movement in said path and for thereafter moving the wiper in a straight line relatively to its carrier.

5. In a machine for operating on shoes, a lasting wiper, means energized by a previous cycle of the machine for yieldingly advancing the wiper and moving it over the bottom of a shoe in the machine, and power-operated means for retracting the wiper.

6. In a machine for operating on shoes, a lasting wiper, an actuator therefor, a spring energized by a previous cycle of the machine for yieldingly advancing the actuator thereby to move the wiper over the bottom of a shoe in the machine, and power-operated means for positively retracting the actuator.

7. In a machine for operating on shoes, a lasting wiper, a carrier therefor constructed and arranged for limited movement widthwise of a shoe in the machine, an actuator, and means energized by a previous cycle of the machine for yieldingly operating the actuator first to advance the carrier together with the wiper to the limit of movement of the carrier and thereafter to move the wiper relatively to the carrier.

8. In a machine for operating on shoes, a lasting wiper, a carrier therefor constructed and arranged for limited movement widthwise of a shoe in the machine, an actuator, means energized by a previous cycle of the machine for yieldingly operating the actuator first to advance the carrier together with the wiper to the limit of movement of the carrier and thereafter to move the wiper relatively to the carrier, yielding means for returning the wiper to its initial position relatively to the carrier, and power-operated means for positively returning the carrier to its initial position.

9. In a machine for operating on shoes, a lasting wiper, a carrier therefor constructed and arranged for limited movement in an arcuate path about an axis extending heightwise of a shoe in the machine, and means energized by a previous cycle of the machine for first moving the carrier together with the wiper through its arcuate path and to the limit of its movement in said path and for thereafter moving the wiper over the bottom of the shoe.

10. In a machine for operating on shoes, a lasting wiper, a carrier therefor, yielding means for holding the wiper in retracted position relatively to the carrier, and power-energized means for yieldingly moving the wiper over the bottom of a shoe in the machine after the carrier has brought the wiper into engagement with the shoe.

11. In a machine for operating on shoes, a lasting wiper, a carrier therefor constructed and arranged for limited movement widthwise of a shoe in the machine, yielding means for holding the wiper in retracted position relatively to the carrier, and means for first moving the carrier together with the wiper to the limit of its movement widthwise of the supported shoe and for thereafter moving the wiper relatively to the carrier.

12. In a machine for operating on shoes, a lasting wiper, a carrier therefor constructed and arranged for limited movement in an arcuate path about an axis extending heightwise of a shoe in the machine, yielding means for holding the wiper in retracted position relatively to the carrier, and means for first moving the carrier together with the wiper through its arcuate path and to the limit of its movement in said path and for thereafter moving the wiper in a straight line relatively to the carrier.

13. In a machine for operating on shoes, a lasting wiper, a slide on which the wiper is mounted, a carrier for the slide, a stop for limiting advancing movement of the slide relatively to the carrier, and power-energized means for yieldingly advancing the slide relatively to the carrier.

14. In a machine for operating on shoes, a lasting wiper, a slide on which the wiper is mounted, a carrier for the slide constructed and arranged for limited movement widthwise of a shoe in the machine, yielding means for holding the slide in retracted position relatively to the carrier, and means for advancing the slide after the carrier has come to the limit of its movement widthwise of a supported shoe.

15. In a machine for operating on shoes, a lasting wiper, a slide on which the wiper is mounted, a carrier for the slide constructed and arranged for limited movement widthwise of a shoe in the machine, yielding means for holding the slide in retracted position relatively to the carrier, and power-energized means for first yieldingly moving the carrier to the limit of its movement widthwise of the supported shoe and for thereafter advancing the slide relatively to the carrier to the limit of its advancing movement.

16. In a machine for operating on shoes, a lasting wiper, fastening-inserting means for fastening an overlasted margin to the bottom of a shoe in the machine, a slide on which the wiper and the fastening-inserting means are mounted, a carrier for the slide constructed and arranged for limited movement in an arcuate path about an axis extending heightwise of the shoe, and means for first moving the carrier together with the slide through its arcuate path and to the limit of its movement in said path and for thereafter moving the slide in a straight line relatively to its carrier.

17. In a machine for operating on shoes, a lasting wiper, fastening-inserting means for fastening an overlasted margin to the bottom of a shoe in the machine, a slide to which the wiper and the fastening-inserting means are secured in fixed relation to each other, a carrier for the slide constructed and arranged for limited movement widthwise of a supported shoe, and means for first moving the carrier together with the slide to the limit of its movement widthwise of the supported shoe and for thereafter moving the slide relatively to its carrier.

18. In a machine for operating on end portions of shoes, means for supporting a last with an upper thereon, a member constructed and arranged to impart lateral pressure to an end portion of the upper on its last, a lasting wiper, a carrier therefor constructed and arranged for movement widthwise of the last, means on the carrier arranged for engagement with the end-pressing member in order to arrest the carrier, and means for moving the wiper relatively to the carrier after the carrier has been so arrested.

19. In a machine for operating on end portions of shoes, means for supporting a last with an upper thereon, a member constructed and arranged to impart lateral pressure to an end portion of the upper, a lasting wiper, a carrier therefor constructed and arranged for movement in an arcuate path about an axis extending heightwise of the last, means on the carrier arranged to engage the upper-pressing member and thereby to arrest the movement of the carrier in said path, and means for moving the wiper relatively to the carrier after the movement of the carrier has been arrested.

20. In a machine for operating on end portions of shoes, means for supporting a last with an upper thereon, a member constructed and arranged to impart lateral pressure to an end portion of the upper, a lasting wiper, a carrier therefor constructed and arranged for movement widthwise of the last, movement of the carrier toward the last being limited by engagement of the carrier with said end-pressing member, and means for first moving the carrier widthwise of the last into engagement with said member and then advancing the wiper over and upon the shoe bottom and thereafter pressing the wiper downwardly against the margin of the shoe bottom.

21. In a machine for operating on shoes, means for supporting a last with an upper thereon, wipers for working portions of the overlasting margins of the upper over an insole on the last bottom, an end-embracing band, manually-operated means for drawing the band about an end portion of the upper, and automatic means for thereafter advancing the wipers and imparting additional pressure to the band widthwise of the shoe.

22. In a machine for operating on end portions of shoes, means for supporting a last with an upper thereon, wipers for working portions of the overlasting margin of the upper over an insole on the last bottom, an end-embracing band, manually-operated means for drawing the band about an end portion of the upper, automatic means for thereafter advancing the wipers and imparting additional pressure to the band widthwise of the shoe, and means for fastening the overlasted margin to an insole on the last bottom.

23. In a machine for operating on shoes, a shoe support constructed and arranged for movement to present a supported shoe to the operating instrumentalities of the machine, a lasting wiper, a carrier therefor constructed and arranged for limited movement in an arcuate path about an axis extending heightwise of a shoe supported in inverted position in the machine, and means mounted on the carrier for yieldingly holding the wiper below the level of that portion of the shoe bottom upon which it operates.

24. In a machine for operating on shoes, a shoe support constructed and arranged for movement to present a supported shoe to the operating instrumentalities of the machine and to hold the shoe positively against downward movement, a lasting wiper, a carrier therefor, said wiper being movable heightwise of the carrier, means mounted on the carrier for yieldingly urging the wiper downwardly, and a stop on the carrier for limiting downward movement of the wiper.

25. In a machine for operating on shoes, a plurality of lasting wipers constructed and arranged to operate on one side of a shoe in the machine, a carrier for said wipers constructed and arranged for limited movement in an arcuate path about an axis extending heightwise of the supported shoe, and means for first moving the carrier together with the wipers through its arcuate path and to the limit of its movement in said path and for thereafter moving said wipers in a straight line relatively to their carrier.

26. In a machine for operating on shoes, a plurality of lasting wipers constructed and arranged to operate on one side of a shoe in the machine, a slide by which said wipers are supported, a carrier for the slide, and power-energized means for yieldingly advancing the slide relatively to the carrier thereby to move said wipers in unison over the margin of the shoe, said power-energized means operating thereafter to press the wipers downwardly against the shoe bottom.

27. In a machine for operating on shoes, means for supporting a last with an upper thereon, a band constructed and arranged to embrace one end of the upper on its last, a normally retracted depressor for depressing the support together with the last and upper mounted thereon, and manually-operated means for actuating the depressor and the band in timed relation to each other.

28. In a machine for operating on heel portions of shoes, a shoe support permanently mounted on the machine frame for movement to and from operative position, a heel-embracing band movable with the work support as the latter moves to and from operative position, and manually-operated means for drawing the band about the heel portion of a supported shoe while the support is out of operative position and before it begins to advance into operative position.

29. In a machine for operating on heel portions of shoes, a shoe support, yielding means for holding the support against downward movement, means for depressing the support with a shoe mounted thereon, means for embracing and gripping the heel portion of the supported shoe and thereby holding the shoe and its support from return movement, and means constructed and arranged to engage the work support and lock it against further depression.

30. In a machine for operating on shoes, a shoe support, yielding means for holding the support against downward movement, means for depressing the support with a shoe mounted thereon to a predetermined elevation, a heel band for embracing and gripping the heel portion of the shoe and thereby holding the shoe and its support from return movement, and power-operated means constructed and arranged to engage the work support and lock it against further depression.

31. In a machine for operating on shoes, a shoe support movable to and from operative position, a depressor constructed and arranged to impart downward movement to the support with a shoe mounted thereon while the support remains at the limit of its movement from operative position, means constructed and arranged to engage the shoe and thereby to hold the shoe and its support from upward movement, and means constructed and arranged to engage the work support and lock it against further depression.

32. In a machine for operating on shoes, a shoe support movable to and from operative position, yielding means for holding the support against downward movement, a depressor constructed and arranged to move the support with a shoe mounted thereon downwardly to a predetermined limit while the support remains at the limit of its movement from operative position, means for actuating the depressor, and means for returning the depressor to inoperative position while the shoe support remains at the limit of its movement from its operative position.

33. In a machine for operating on shoes, a shoe support movable to and from operative position, yielding means for holding the support against downward movement, a depressor constructed and arranged to move the support with a shoe mounted thereon downwardly to a predetermined limit while the support remains at the limit of its movement from its operative position, means for actuating the depressor, a gripper constructed and arranged to engage the supported shoe and thereby to hold the shoe and its support from upward movement, and means for returning the depressor to inoperative position while the shoe support remains at the limit of its movement from its operative position.

34. In a machine for operating on shoes, a shoe support movable to and from operative position, yielding means for holding the support against downward movement, a depressor constructed and arranged to move the support with a shoe mounted thereon downwardly to a predetermined limit while the support remains at the limit of its movement from its operative position, and manually-operated means for actuating the depressor including an extensible link the length of which determines the extent of the downward movement of the depressor.

35. In a machine for operating on shoes, a shoe support, yielding means for holding the support against downward movement, a depressor for moving the support with a shoe thereon downwardly to a predetermined limit, a treadle for actuating the depressor, connections from the treadle to the depressor, and means for breaking said connections after the depressor has reached the limit of its downward movement.

36. In a machine for operating on shoes, a shoe support, yielding means for holding the support against downward movement, a depressor for imparting downward movement to the support with a shoe mounted thereon, operating connections from the depressor including a link, a lever for operating on the link, said link and lever being relatively movable to break the connection therebetween, and means operating after the depressor has reached the limit of its downward movement to break the connection between said link and lever.

37. In a machine for operating on shoes, a shoe support, yielding means for holding the support against downward movement, a depressor for imparting downward movement to the support with a shoe mounted thereon, operating connections from the depressor including an extensible link the length of which determines the limit of the downward movement of the depressor, a lever for operating on the link, said link and lever being relatively movable to break the connection therebetween, means operating after the depressor has reached the limit of its downward movement to break the connection between said link and lever, and means for returning the depressor to its initial position.

38. In a machine for operating on shoes, a shoe support, yielding means for holding the support against downward movement, a depressor for moving the support with a shoe mounted thereon downwardly to locate the shoe bottom in a predetermined position heightwise of the shoe, a heel gripper constructed and arranged to engage the heel portion of the shoe and thereby to hold the shoe and its support from return movement, and treadle-actuated means for first actuating the depressor, then actuating the gripper and finally releasing the depressor.

39. In a machine for operating on shoes, a shoe support, yielding means for holding the support against downward movement, a depressor for moving the support with a shoe mounted thereon downwardly to a predetermined limit, a heel-embracing band, and treadle-actuated means for actuating the depressor, then actuating the band to grip the heel portion of the shoe while holding the depressor at the limit of its downward movement and finally releasing the depressor.

40. In a machine for operating on shoes, the combination of operating instrumentalities, a work support movable to and from operative position, said support comprising a hollow shaft which is immovable endwise thereof and a shoe-supporting spindle, and means for engaging a shoe on the spindle and thereby holding the spindle against endwise movement in one direction while the support is out of operative position.

41. In a machine for operating on shoes, a work support comprising a hollow shaft which is immovable endwise thereof, a spindle yieldingly supported therein, and means carried by the hollow shaft constructed and arranged to engage a shoe supported on the spindle and thereby to hold the shoe and the spindle against upward movement.

42. In a machine for operating on shoes, a shoe support comprising a hollow shaft which is immovable endwise thereof, a spindle yieldingly supported therein and constantly urged upwardly thereof, shoe-engaging means for limiting upward movement of the spindle and the shoe comprising a heel-embracing band, and a pair of arms carried by the hollow shaft, the upper ends of which are secured to opposite ends of the band.

43. In a machine for operating on shoes, a shoe support movable to and from operative position comprising a hollow shaft which is immovable endwise thereof, a spindle yieldingly supported therein and constantly urged upwardly thereof, shoe-engaging means for limiting upward movement of the spindle comprising a heel-embracing band, band-supporting means carried by the hollow shaft, and manually-operated means for actuating the heel-embracing band while the work support is out of operative position.

44. In a machine for operating on shoes, a shoe support comprising a hollow shaft, a spindle yieldingly supported therein, shoe-engaging means for holding the spindle and the shoe from upward movement comprising a heel-embracing band, a pair of arms carried by the hollow shaft, the upper ends of which are secured to opposite ends of the band, and manually-operated means for swinging said arms widthwise of the shoe toward each other and for thereafter swinging the arms forwardly of the shoe.

45. In a machine for operating on shoes, a work support movable to and from operative position, an end-embracing band carried by the work support, yielding means for holding the band in inoperative position, means for locking the band in operative position, and means operating automatically during movement of the work support from its operative position to unlock said band.

46. In a machine for operating on end portions of shoes, an end-embracing band, and manually-operated means for first moving the ends of the band widthwise of a shoe toward each other and for thereafter moving the band bodily lengthwise of the shoe.

47. In a machine for operating on end portions of shoes, an end-embracing band, a pair of arms to which the opposite ends of the band are secured, and treadle-actuated mechanism for first moving the arms toward each other to bring the ends of the band into engagement with opposite sides of a shoe in the machine and for thereafter moving the arms lengthwise of the shoe to bring the band into engagement with one end of the shoe.

48. In a machine for operating on heel portions of shoes, a heel-embracing band, a pair of arms to which the opposite ends of the band are secured, treadle-actuated mechanism for first moving the arms toward each other to bring the ends of the band into engagement with opposite sides of the heel portion of a shoe in the machine and for thereafter moving the arms forwardly of the shoe to bring the band into engagement with the back of the heel portion of the shoe, yielding means for holding said arms at the limit of their movement away from each other and at the limit of their movement rearwardly of the supported shoe, and a treadle latch for holding the band in heel-embracing position.

49. In a machine for operating on end portions of shoes, an end-embracing band, members to which the opposite ends of the band are secured, a pair of arms in which said members are swiveled for movement about axes coinciding with the shoe-engaging face of the band, and manually-operated means for moving the arms toward each other and for thereafter moving the arms lengthwise of a shoe in the machine.

50. In a machine for operating on end portions of shoes, gripping means constructed and arranged to engage opposite sides of a shoe in the machine at points spaced heightwise of the shoe from the shoe bottom, and means for effecting relative movement of the shoe and the gripping means heightwise of the shoe after the gripping means has been brought into engagement with the shoe.

51. In a machine for operating on end portions of shoes, an end-embracing band, members to which the opposite ends of the band are secured, said members providing the sole support for the band, means for actuating the band-supporting members to bring the ends of the band in against the sides of a shoe in the machine, means for relatively moving the shoe and the band heightwise of the shoe after the band has been brought into engagement with the sides of the shoe, and means for imparting bodily movement to the band lengthwise of the shoe to bring the band against one end of the shoe during said relative movement.

52. In a machine for operating on end portions of shoes, a shoe support movable to and from operative position, an end-embracing band arranged for movement with said support as the latter moves to and from its operative position, and means operable while the support is out of its operative position for effecting relative movement of the shoe and the band thereby to wipe the band lengthwise of the shoe and heightwise thereof toward the shoe bottom.

53. In a machine for operating on the heel portions of shoes, a shoe support movable to and from operative position, a heel band carried by said support, a depressor constructed and arranged to engage the bottom of an inverted shoe on said support while the support is at the limit of its movement from operative position, and manually-operated means for first bringing the end portions of the band into engagement with opposite sides of the heel portion of the shoe and for thereafter imparting to the band a movement of translation forwardly of the shoe while simultaneously actuating the depressor to impart downward movement to the shoe.

54. In a machine for operating on heel portions of shoes, a support for an inverted last, a heel-embracing band, a pair of arms to which the opposite ends of the band are secured, means for moving the arms toward each other to bring the band into engagement with opposite sides of an upper on the last and for thereafter moving the arms forwardly of the supported last, and means for depressing the last together with the upper thereon during said forward movement of the band.

55. In a machine for operating on heel portions of shoes, a support for an inverted last movable to and from operative position, a heel-embracing band, a depressor for downwardly moving the last and the upper thereon, and manually-operated means operable while the support is out of operative position first for bringing the ends of the band into engagement with opposite sides of the upper on the last, then for moving the band bodily forwardly of the supported last and simultaneously actuating the depressor.

56. In a machine for operating on heel portions of shoes, a support for an inverted last movable to and from operative position, a heel-embracing band, a depressor for downwardly moving the last and an upper thereon, and manually-operated means operable while the support is out of operative position first to bring the ends of the band into engagement with opposite sides of the upper on the last, then to impart to the band a movement of translation forwardly of the supported last and simultaneously to actuate the depressor and thereafter to release the depressor.

57. In a machine for operating on heel portions of shoes, a support for an inverted last, said support comprising a hollow shaft and a last-supporting spindle yieldingly mounted therein, a heel-embracing band constructed and arranged for engagement with an upper on the last, a depressor for imparting downward movement to the last and the upper thereon, band-supporting means comprising a pair of arms supported on said hollow shaft, means for moving the arms toward each other to bring the band against the sides of the upper on the last, and means for thereafter simultaneously moving the arms forwardly of the last and actuating the depressor.

58. In a machine for assembling uppers on lasts, a work support for an inverted last, said support being movable to and from operative position, fastening-inserting means for fastening the overlasting margin of an upper to an insole on the bottom of a last on the work support, and means for depressing the last to locate its bottom in operative position heightwise of the work support while the support is at the limit of its movement from its operative position.

59. In a machine for assembling uppers on lasts, a work support for an inverted last, said support being movable to and from operative position, fastening-inserting means for fastening the overlasting margin of an upper to an insole on the bottom of a last on the work support, means for positioning the last bottom in operative position heightwise of the work support while the support is at the limit of its movement from its operative position, a heel-embracing band operable while the shoe support remains at the limit of its movement from its operative position for engaging the heel portion of the upper and thereby securing the last and upper in operative position heightwise of the work support, and means operating during movement of the work support from operative position for disengaging the band from the upper.

60. In a machine for assembling shoe parts, including a molded counter, on a last, a support for an inverted last movable to and from operative position, a heel-embracing band for clamping the shoe parts against a last on the work support, said band being movable with the work support as the latter moves to and from operative position, a depressor constructed and arranged for engagement with the flange of the counter, and means for moving the band into engagement with opposite sides of the heel portion of the upper and for thereafter moving the band bodily forwardly of the supported last while simultaneously actuating the depressor to move the last and the shoe parts thereon downwardly relatively to the band.

61. In a machine for assembling shoe parts, including a molded counter, on a last, a support for an inverted last movable to and from operative position, a heel-embracing band for clamping the shoe parts against a last on the work support, said band being movable with the work support as the latter moves to and from operative position, a depressor constructed and arranged for engagement with the flange of the counter, and manually-operated means operable while the support is out of operative position for moving the band into engagement with opposite sides of the heel portion of the upper and for thereafter moving the band bodily forwardly of the supported last while simultaneously actuating the depressor to move the last and the shoe parts thereon relatively to the band.

62. In a machine for assembling shoe parts, including a molded counter, on a last, a support for an inverted last movable to and from operative position, a heel-embracing band movable with the work support as the latter moves to and from operative position, a last-depressor normally elevated above the last bottom, a treadle, connections from the treadle for first moving the band into engagement with opposite sides of the shoe parts on the last, then moving the band bodily forwardly of the supported last while simultaneously actuating the depressor to move the last and the upper thereon downwardly relatively to the band and thereafter releasing the depressor, and means constructed and arranged to hold the band in heel-embracing position while the support is in operative position.

63. In a machine for assembling shoe parts, including a molded counter, on a last, a support for an inverted last movable to and from operative position, a heel-embracing band movable with the work support as the latter moves to and from operative position, a last-depressor normally elevated above the bottom of a last on the work support, a treadle, connections from the treadle for first moving the band into engagement with opposite sides of an upper on the last, then imparting to the band a movement of translation forwardly of the supported last while simultaneously actuating the depressor to move the last and the shoe parts thereon downwardly relatively to the band and thereafter releasing the depressor, means constructed and arranged to hold the band in heel-embracing position while the support is in operative position, and means operating during the movement of the support from operative position to return the band to its initial position.

64. In a machine for assembling shoe parts on lasts, a work support movable both heightwise and lengthwise of a last supported thereon to position the work in operative relation to fastening-inserting means, manually-operated means operable while the support is out of operative position and before it begins to advance into operative position for securing the support together with the last and the shoe parts thereon in a predetermined position heightwise thereof, means for securing the support in operative position, means for driving a fastening through the back of an upper and into the last, and means for driving another fastening through the margin of the shoe bottom and the overlasted shoe parts in the region of the longitudinal median line of the last.

65. In a machine for assembling on lasts shoe parts having a molded counter adhesively secured in predetermined relation thereto, a work support movable both heightwise and lengthwise of a last supported thereon to position the work in operative relation to fastening-inserting means, means operable while the support is out of operative position to engage the flange of the molded counter and move it toward the last bottom thereby to position the shoe parts heightwise of the last and then to depress the support and the work thereon to locate the heel-seat portion of the last bottom in predetermined position heightwise of the last, means operable while the support is out of operative position for securing the support and the work thereon in predetermined position heightwise of the last, and means for driving a fastening through the overlasting margin of the shoe parts, including the flange of the counter, and through the margin of an insole in the region of the longitudinal median line of the last.

66. In a machine for operating on heel portions of shoes, a support for a last with an upper thereon, means for clamping the heel portion of the upper against a last on the work support comprising grippers constructed and arranged to engage the top margin at opposite sides of the upper, a heel-embracing band constructed and arranged to engage a portion of the shoe between the top margin and the overlasting margin, and means for spacing the ends of the band widthwise of the shoe from the grippers.

67. In a machine for operating on heel portions of shoes, a heel-embracing band, members for clamping an upper against a last in the machine at points disposed upwardly of the upper from the heel band, and means for simultaneously actuating the band and the clamps.

68. In a machine for operating on heel portions of shoes, a heel-embracing band, members for clamping an upper against a last in the machine at points disposed upwardly of the upper from the heel band, means for actuating the band, and means operated by the band-actuating means for actuating the clamps.

69. In a machine for operating on heel portions of shoes, a heel-embracing band, band-carrying arms, clamps constructed and arranged to engage portions of a shoe in the machine between the heel-embracing band and the top of the shoe, means for moving the arms toward each other to bring the ends of the band into engagement with the shoe, and means carried by said arms whereby the clamps are brought into engagement with the shoe during said movement of the arms.

70. In a machine for operating on heel portions of shoes, a heel-embracing band, band-carrying arms, clamps constructed and arranged to engage portions of a shoe in the machine between the heel-embracing band and the top of the shoe, means for moving the arms toward each other to bring the ends of the band into engagement with the shoe, means carried by said arms whereby the clamps are brought into engagement with the shoe during said movement of the arms, and spacers between the arms and the clamps for arresting the movement of the arms toward each other when the clamps come into engagement with the shoe.

71. In a machine for operating on heel portions of shoes, a heel-embracing band, band-carrying arms, clamps constructed and arranged to engage portions of a shoe in the machine between the heel-embracing band and the top of the shoe, means for moving the arms toward each other to bring the ends of the band into engagement with the shoe, means carried by said arms whereby the clamps are brought into engagement with the shoe during said movement of the arms, spacers between the arms and the clamps for arresting the movement of the arms toward each other when the clamps come into engagement with the shoe, and means for moving the spacers from operative position to permit further movement of the arms toward each other.

72. In a machine for operating on heel portions of shoes, clamps constructed and arranged to engage the top margin at opposite sides of the heel portion of an upper on a last in the machine, means constructed and arranged to engage the upper between the portions engaged by the clamps and the overlasting margin, arms for carrying said upper-engaging means arranged for movement toward each other to bring said upper-engaging means into operative position, and means between the arms and the clamps for limiting the movement of the arms toward each other, said limiting means being adjustable to permit light pressure of the upper-engaging means against the upper.

73. In a machine for operating on heel portions of shoes, clamps constructed and arranged to engage the top margin at opposite sides of the heel portion of an upper on a last in the machine, means constructed and arranged to engage the upper between the portions engaged by the clamps and the overlasting margin, arms for carrying said upper-engaging means arranged for movement toward each other to bring said upper-engaging means into operative position, means including a pair of spacers for limiting the movement of the arms toward each other, said limiting means being adjustable to permit light pressure of the upper-engaging means against the upper, and means for moving the spacers out of operative position to permit further movement of the arms toward each other.

74. In a machine for operating on heel portions of shoes, a shoe support comprising a hollow shaft, a shoe-supporting spindle yieldingly mounted in said shaft, clamps mounted on said spindle constructed and arranged to engage the top margin of an upper on a last on the spindle at opposite sides of the heel portion, shoe-engaging means constructed and arranged to engage opposite sides of the heel portion of the upper between the portions engaged by the clamps and the overlasting margin of the upper, and arms for carrying said shoe-engaging means, said arms being mounted on the hollow shaft for movement toward and from each other.

75. In a machine for operating on heel portions of shoes, a heel-embracing band, clamps constructed and arranged to engage opposite sides of the heel portion of a shoe in the machine between the portion engaged by the band and the top of the shoe, means for supporting the band by its opposite ends comprising arms movable toward each other and movable forwardly of the shoe, and spacing means for limiting the movement of the arms toward each other while permitting unrestricted movement of the arms forwardly of the shoe.

76. In a machine for operating on heel portions of shoes, a heel-embracing band, clamps constructed and arranged to engage opposite sides of the heel portion of a shoe in the machine between the portion engaged by the band and the top of the shoe, means for supporting the band by its opposite ends comprising arms movable toward each other and movable forwardly of the shoe, and abutters carried by the respective arms and arranged to engage said clamps thereby to limit movement of the arms toward each other without limiting movement of the arms forwardly of the shoe.

77. In a machine for operating on heel portions of shoes, a support for a last with an upper thereon movable to and from operative position, means for clamping the heel portion of an upper against a last on the work support comprising grippers constructed and arranged to engage the top margin at opposite sides of the upper, a heel-embracing band constructed and arranged to engage a portion of the shoe between the top margin and the overlasting margin, means for spacing the ends of the band widthwise of the shoe from the grippers, and means operating during the movement of the last support from operative position to release the pressure of both the grippers and the band on the shoe.

78. In a machine for assembling and shaping uppers upon lasts, a work support movable to and from operative position, a heel-embracing band movable with the work support as the latter moves to and from operative position, manually-operated means for drawing the band about the heel portion of an upper on a last on the work support while the support is out of lasting position, and means for working the overlasting margin of an upper over an insole on the last bottom.

79. In a machine for assembling and shaping uppers upon lasts, a work support movable to and from operative position, a heel-embracing band movable with the work support as the latter moves to and from operative position, manually-operated means for drawing the band about the heel portion of an upper on a last on the work support while the work support is out of operative position, wipers for lasting portions of the overlasting margin at the heel end of the upper over and upon an insole on the last bottom, and fastening-inserting means for securing the overlasted margin to the insole.

80. In a machine for assembling and shaping uppers upon lasts, a work support movable to and from operative position, a heel-embracing band movable with the work support as the latter moves to and from operative position, manually-operated means for drawing the band about the heel portion of an upper on a last on the work support while the work support is out of operative position, means for holding the band in heel-embracing position, wipers for lasting portions of the overlasting margin at the heel end of the upper over and upon an insole on the last bottom, fastening-inserting means for securing the overlasted margin to the insole, and means operating during movement of the work support from operative position to disengage the heel band from the upper.

81. In a machine for operating on shoes, a shoe support movable to and from operative position, said support comprising a hollow shaft, a spindle mounted therein for supporting an inverted shoe, means contained within the hollow shaft for yieldingly sustaining the spindle therein, means on the shaft for initially determining the position of the spindle endwise of the shaft, and means constructed and arranged to engage the bottom of a shoe on the support while the support is at the limit of its movement from its operative position and to position the shoe and its supporting spindle in operative position endwise of the hollow shaft.

82. In a machine for operating on shoes, a shoe support movable to and from operative position, said support comprising a hollow shaft, a spindle mounted therein for supporting an inverted shoe, means contained within the hollow shaft for yieldingly sustaining the spindle therein, a collar on the shaft for initially determining the position of the spindle endwise of the shaft, a depressor constructed and arranged to engage the bottom of a shoe on the support while the support is at the limit of its movement from its operative position and to position the shoe and its supporting spindle in operative position endwise of the shaft, and means carried by the hollow shaft and constructed and arranged to engage the shoe while the shoe support is at the limit of its movement from its operative position thereby to hold the shoe in operative position endwise of the shaft during the movement of the shoe support to its operative position and thereafter during the operations performed on the shoe.

BERNHARDT JORGENSEN.